United States Patent
Freedman et al.

(10) Patent No.: US 12,471,573 B1
(45) Date of Patent: Nov. 18, 2025

(54) POULTRY COOP AND CONFINEMENT AREA

(71) Applicant: Nestera Inc., Newark, DE (US)

(72) Inventors: Richard Alan Freedman, Essex (GB); Kyle Hardman, Essex (GB)

(73) Assignee: Nestera Inc., Newark, DE (US)

( * ) Notice: Subject to any disclaimer, the term of this patent is extended or adjusted under 35 U.S.C. 154(b) by 0 days.

(21) Appl. No.: 19/030,590

(22) Filed: Jan. 17, 2025

(51) Int. Cl.
*A01K 31/18* (2006.01)

(52) U.S. Cl.
CPC .................................. *A01K 31/18* (2013.01)

(58) Field of Classification Search
CPC ....................................................... A01K 31/18
See application file for complete search history.

(56) References Cited

U.S. PATENT DOCUMENTS

| | | | | |
|---|---|---|---|---|
| 531,694 A | * | 1/1895 | Nix | A01K 31/18 119/303 |
| 837,937 A | * | 12/1906 | Legg | A01K 31/18 119/491 |
| 1,464,459 A | * | 8/1923 | White | A01K 31/18 119/494 |
| 1,993,112 A | * | 3/1935 | Patterson | A01K 31/002 119/493 |
| 2008/0202443 A1 | * | 8/2008 | Potter | A01K 31/22 119/437 |
| 2010/0192869 A1 | * | 8/2010 | Rose | A01K 1/03 119/491 |
| 2016/0192616 A1 | * | 7/2016 | Kitchen | A01K 1/034 119/485 |
| 2019/0254261 A1 | * | 8/2019 | Volin | A01K 31/18 |

* cited by examiner

*Primary Examiner* — Monica L Perry
*Assistant Examiner* — Aaron M Rodziwicz
(74) *Attorney, Agent, or Firm* — Nyemaster Goode P.C.

(57) ABSTRACT

A coop that includes a plurality of interlocking walls forming a roosting chamber, the first side panel having a nesting chamber access aperture, a second side wall having a roosting chamber access panel, a second side panel top section and a second side panel bottom section. The coop further includes a nesting chamber positioned over a nesting chamber access aperture within the first side panel, the nesting chamber having a left side wall, a right side wall, an end wall, and a nesting chamber roof.

20 Claims, 25 Drawing Sheets

POULTRY COOP AND CONFINEMENT AREA

BACKGROUND

Current chicken coops have many problems. Most chicken coops produced today are one off constructed original chicken coops that are often made by individuals through purchases of hardware from local stores and/or cheap wired fencing. They are often not sturdy and therefore the chickens raised in them are at risk of harm from predators. Moreover, most are made of wood, which rots, is very heavy, and not easily cleaned. There is not easy access to the interior to have the interior of the chicken coop washed via a water application or power washing application. Wood also requires regular maintenance with paint or stain, which is time consuming and costly to maintain. Additionally, the wood is not recyclable and not produced from recyclable material, but rather a natural material. Use and construction of a coop constructed of a material such as cement is impractical due to the weight for shipping and the need for the chicken coop to be a somewhat temporary structure. Additionally, the typical construction of a typical chicken coop often utilizes screws, nails and possibly other hardware and fasteners that require tools to install them.

SUMMARY

An aspect of the present disclosure is generally directed to a poultry housing that includes a roosting chamber comprised of a plurality of interlocking walls having a front panel, a first side panel, a back panel and a second side panel that, together with a roosting chamber floor that interlocks with the front panel, the first side panel, the back panel and the second side panel and roosting chamber roof that interlocks with the front panel, the first side panel, the back panel and the second side panel, define an interior roosting chamber volume of the roosting chamber. The first side panel typically includes a nesting chamber access aperture defined by a cutout perimeter spaced from a perimeter of the first side panel and wherein the second side wall comprises a roosting chamber access panel, a second side panel top section and a second side panel bottom section where the second side panel top section and the second side panel bottom section define a roosting chamber access aperture and the roosting chamber access panel overlays the roosting chamber access aperture and a portion of the second side panel top section and the second side panel bottom section when the roosting chamber access panel is engaged with the second side panel top section and the second side panel bottom section. The roosting chamber access panel is typically removable and engageable by hand and without the use of tools to allow a user to access the interior roosting chamber volume through the roosting chamber access aperture. The roosting chamber access panel further typically includes at least one downwardly extending roosting floor aperture engaging extension that matingly engages a corresponding number of roosting floor apertures within at least one roosting chamber floor projections that extend away from a main portion of the roosting chamber floor. The poultry housing also typically includes a nesting chamber positioned over a nesting chamber access aperture within the first side panel of the roosting chamber where the nesting chamber comprises a left side wall, a right side wall, and end wall and a nesting chamber roof.

Yet another aspect of the present disclosure is generally directed to a chicken coop that includes a plurality of interlocking walls comprising a front panel, a first side panel, a back panel and a second side panel that together with a roosting chamber floor and roosting chamber roof define an interior roosting chamber volume of a roosting chamber, wherein the first side panel comprises a nesting chamber access aperture defined by a cutout perimeter spaced from a perimeter of the first side panel and wherein the second side wall comprises a roosting chamber access panel, a second side panel top section and a second side panel bottom section; a nesting chamber positioned over a nesting chamber access aperture within the first side panel of the roosting chamber wherein the nesting chamber comprises a left side wall, a right side wall, and end wall and a nesting chamber roof; and a moisture guard engaged with the first side panel and above the nesting chamber roof, wherein the moisture guard is planar and extends between the front panel and the back panel of the roosting chamber.

Another aspect of the present disclosure generally includes a chicken coop construction kit that includes chicken coop construction materials packaged in one or more cuboid shaped containers where the chicken coop construction materials has at least the following components packaged in the one or more cuboid shaped containers that are stackable when shipped: a roosting chamber front panel; a roosting chamber first side panel; a roosting chamber back panel; a roosting chamber second side panel having a centrally located nesting chamber access aperture therein; a roosting chamber floor having at least one drain hole proximate a center of the roosting chamber floor; a roosting chamber roof; a nesting chamber left side wall; a nesting chamber right side wall; a nesting chamber end wall; a nesting chamber roof; a poultry ramp; a left side planar ramp support wall; a right side planar ramp support wall; a planar horizontally positioned step; an elongated, planar moisture guard; and a plurality of fasteners. Typically, a plurality of, any combination or and typically all of at least the roosting chamber front panel, the roosting chamber first side panel, the roosting chamber back panel, the roosting chamber second side panel, the roosting chamber floor, the nesting chamber left side wall, the nesting chamber right side wall, the nesting chamber end wall, and the nesting chamber roof are a composite plastic material where the composite plastic material has (1) an outer layer, and inner layer, and a middle layer consisting of recycled plastic material disposed between the outer layer and the inner layer; or (2) an outer layer, and an inner layer, wherein the inner layer consists of recycled plastic material. The composite plastic material has an exterior facing surface having a feature chosen from at least one color that is not black, a texturization viewable by the naked eye, a wood grain pattern viewable by the naked eye and combinations thereof. The composite plastic material typically is a recycled plastic material in an amount up to 70% by weight of the composite plastic material.

DETAILED DESCRIPTION

Figure 1:
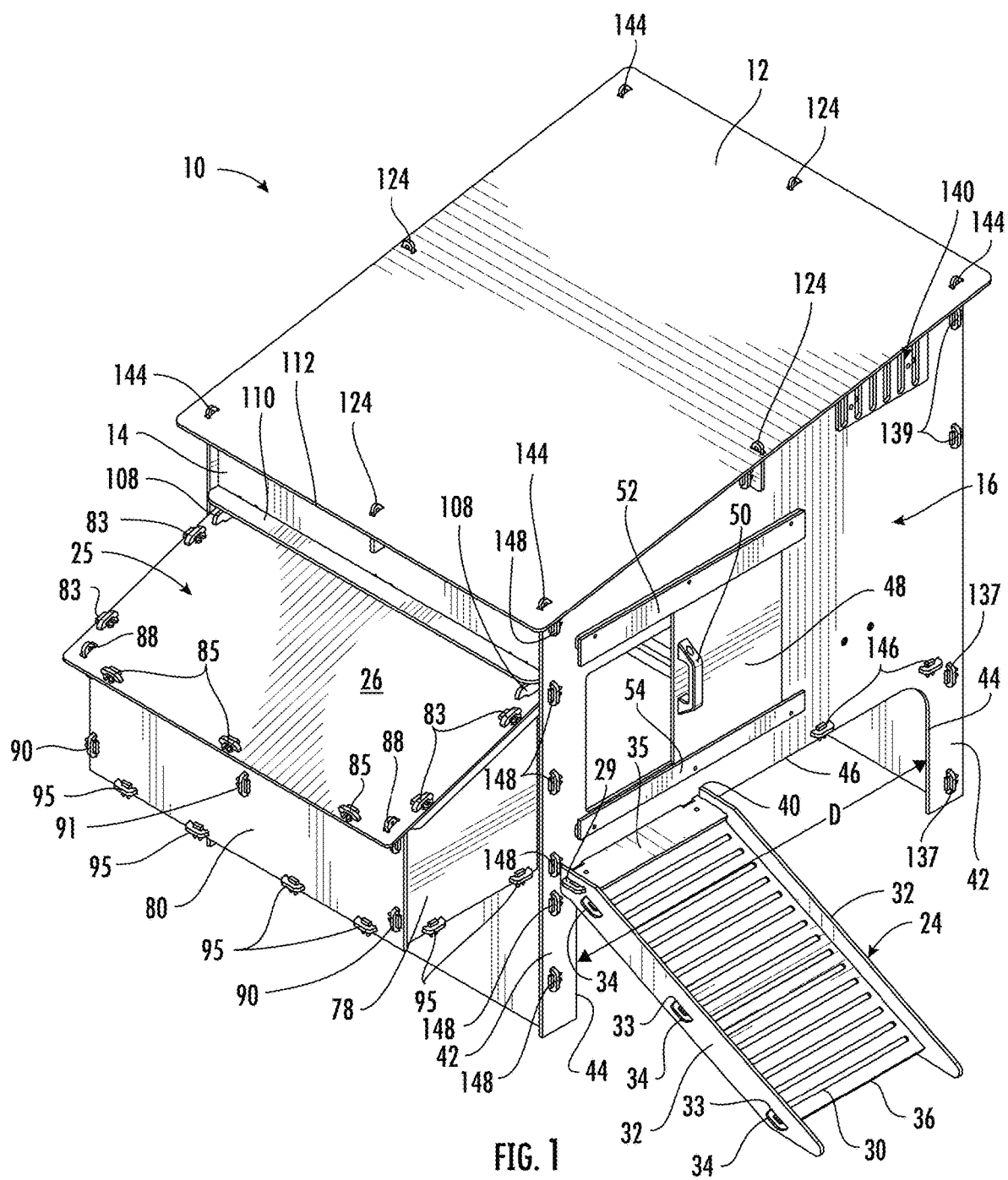
FIG. 1 is a front, upper left perspective view of a livestock coop according to an aspect of the present disclosure.

For purposes of description herein, the terms "upper," "lower," "right," "left," "rear," "front," "vertical," "horizontal," and derivatives thereof shall relate to the invention as oriented in FIG. 1. However, it is to be understood that the subject matter of this disclosure and the claimed invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Where a range of values is provided, it is understood that each intervening value, to the tenth of the unit of the lower limit unless the context clearly dictates otherwise, between the upper and lower limit of that range, and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also included in the disclosure.

In this specification and the appended claims, the singular forms "a," "an" and "the" include plural reference unless the context clearly dictates otherwise.

"Consisting essentially of" in the context of the claims of this application limits the scope of a claim or claim element to the specified materials or steps "and those that do not materially affect the basic and novel characteristic(s)" of the claimed invention as would be known by those of ordinary skill in the art whether or not such a composition is disclosed in the application or not as affecting the basic and novel characteristic.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the Applicant intends to indicate "only A or B but not both" then the term "only A or B but not both" will be employed. Thus, use of the term "or" herein is the inclusive, and not the exclusive use. Also, to the extent that the terms "in" or "into" are used in the specification or the claims, it is intended to additionally mean "on" or "onto."

The present disclosure generally relates to a new improved livestock coop device, kit, and system. The livestock coop, which is typically a chicken coop, but may house other animals, is an easily cleanable and durable device constructed of substantially entirely or entirely plastic structural elements that resist decay and are able to be washed with a power washer or water without harm or damage to the coop.

FIGS. 1-8 of the present disclosure show an aspect of a livestock coop 10 according to an aspect of the present disclosure. The livestock coops of the present disclosure are uniquely constructed to ship flat, be assembled by hand and without the use of tools, have up to about 70% recycled plastic components in the construction of the walls and other material materials, be easily cleaned, resistant to rotting, sturdy, and provide protection to the poultry, chicken, or other livestock caged and living in the coop and the associated and connected environments, such as a caged range area interconnected with the coop.

The livestock coop 10 is typically a chicken coop, but could conceivably be used to hold various type of foul and other livestock. In this disclosure, the remainder of the discussion will be directed toward the chicken coop, but it should be recognized that any livestock may be retained and raised within a coop designed and constructed according to the present disclosure. The livestock coop 10 typically includes a roof 12 over a main interior/roosting space. The livestock coop 10 also typically contains a left side panel 14, a front panel 16, a right side panel 18, a back panel 20 and a bottom floor panel 22, which is optional, but typically used. The livestock coop 10 according to the present disclosure typically also includes a livestock ramp 24 and a nesting chamber 25. The nesting chamber 25 will typically have a nesting chamber top 26, nesting chamber sidewalls 78, and a nesting chamber end wall 80. The nesting chamber side walls typically have an outwardly extending attachment projection 88.

The livestock ramp 24 typically has a livestock ramp top surface 28, a livestock ramp textured pattern 30, which may be any type of textured pattern, such as linear parallel horizontal lines or a serpentine pattern. Conceivably the textured pattern could be separate lines, horizontally configured or diagonally configured or simply a differently textured exterior surface with friction resistant material either adhered to or embedded within the outer portion of the top surface of the livestock ramp. The pattern can be recessed into the plastic material of the ramp or conceivably be a raised pattern or a combination thereof. For example, a sand/silicon or other small rock texture may be added to the top surface. More typically, a raised or recessed pattern is added to or formed into the top surface of the livestock ramp. This is typically cut into or otherwise produced when it is made of a composite, typically a composite plastic material.

The livestock ramp 24 typically further includes livestock ramp supports 32 that extend along the left and right sides across the majority of the perimeter portion of the livestock ramp providing structural support to the overall ramp and a slightly elevated barrier for guiding the livestock on the ramp and helping to prevent the livestock from falling off of the ramp. The livestock ramp supports 32 are typically spaced through one or more slots 33. The slots 33 (see FIG. 4) may be two or more (three shown in FIG. 1, for example) independent and spaced apart, typically evenly spaced apart, slots on each side of the ramp that receive the livestock ramp anchor extensions 34 therethrough or a larger single slot on each side of the livestock ramp. The livestock ramp anchor extensions 34 may be a fixed to the livestock ramp 24 by hand and without the use of tools using the fastening systems 177 of the present disclosure that are described further below (see FIGS. 11A and 11B). The livestock ramp 24 further typically has a rectangular top surface 28 and a correspondingly rectangular livestock ramp downward facing surface 38. The livestock ramp also typically has a livestock ramp bottom edge 36, and a livestock coop engaging edge 40. The livestock coop engaging edge 40 is typically engaged to the front surface of the roosting chamber of the livestock coop by engaging roosting floor protrusions 146 that extend away from the overall roosting floor 119 or by engaging the livestock ramp step that is affixed to the front panel/wall 16 of the roosting chamber. A horizontal livestock ramp step 35 positioned above the ramp has two laterally extending projections 29 that pass-through apertures in the sides of the livestock ramp supports allows the chickens or other livestock easier ingress and egress into the interior of the chicken coop. The step 35 allows for a place for the livestock to stand at a point just outside and below the entrance/exit opening of the livestock coop. While a completely slanted livestock ramp 24 may be used to connected to the coop and allow the chickens to move into and out of the interior of the coop, the use of the horizontally oriented planar livestock ramp step is typically used instead. The horizontal, planar livestock ramp step typically has a long horizontal protrusion that extends away from a majority of one side such that the long, horizontal protrusion may be inserted in a corresponding elongated horizontal aperture in the front panel 16 in a sort of lock and key arrangement. As with other engagements throughout the construction of the livestock coop of the present disclosure, the livestock ramp 24 may be engaged with the roosting floor protrusions 146 extending beyond the central surface area of the roosting floor to allow for the easy engagement of the livestock ramp 24 using a fastening system 177, which can be engaged and disengaged by the installer by hand and without the use of tools.

As shown in FIG. 1, the front panel 16 of the livestock coop 10 has two downwardly extending legs 42 each having inward-facing leg sides 44 of the front panel 16. The inward-facing leg sides 44 define an opening 46 with a width of a distance D between the inward facing leg sides. The distance D is typically between about 27 inches and about 40 inches. The two downwardly, extending legs, 42 typically are planar and have substantially the same or the same width across their entire height until the top portion of the legs begin to engage the front panel 16 at which point, they begin to widen to form a top corner curve on each top corner of the rectangular opening 46. There is a corresponding opening 41 in opposite wall, back panel 20. The construction provides an opening on each side for the chickens to walk through, provide shelter from the elements or the sun under the coop for the animals, and even provide some wind shielding if the animal moves to the corners of the underside portion of the coop where the legs meet the ground. This construction making four shielded corner sections where the livestock can locate and avoid more of the elements of the weather is advantageous for the health and well-being of the chickens or other animals that are residing the coop. The overall footprint dimension of the coop (not including the nesting chamber) may be at its smallest size, from about 27 inches× about 16 inches, at a slightly larger size from about 35 inches×about 25 inches, at a larger size of from about 45 inches×about 36 inches, and at a typical largest size of about 72 inches by about 120 inches in surface area coverage on the ground. The height of the coop is typically at least about 40 inches tall no matter the footprint dimensions, but could range up to about 52 inches tall no matter the footprint dimensions as well.

Figure 12:
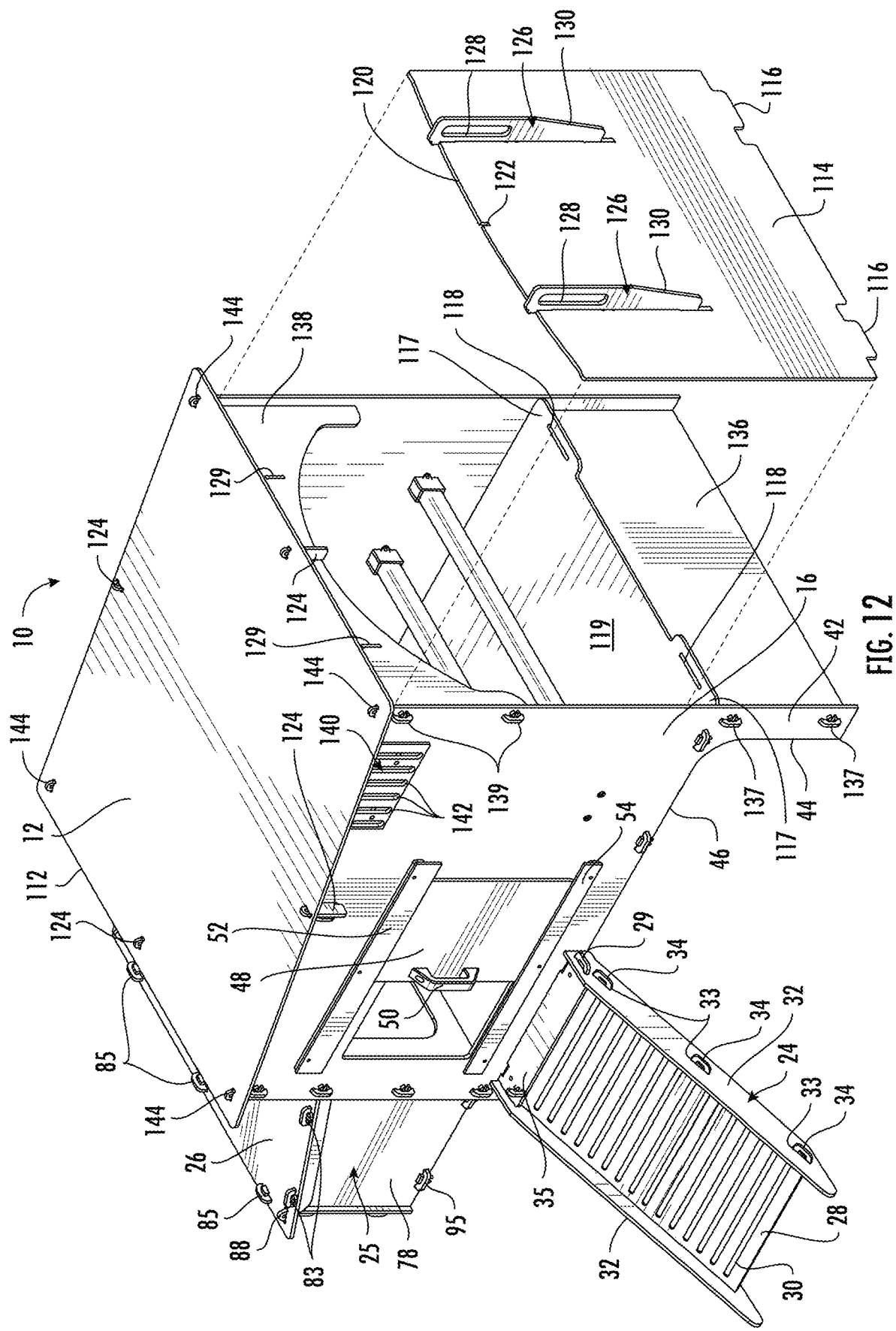
FIG. 12 is an upper right perspective view of a livestock coop according to an aspect of the present disclosure showing the right side wall removable roosting chamber access panel in a disengaged position.
Figure 13A:
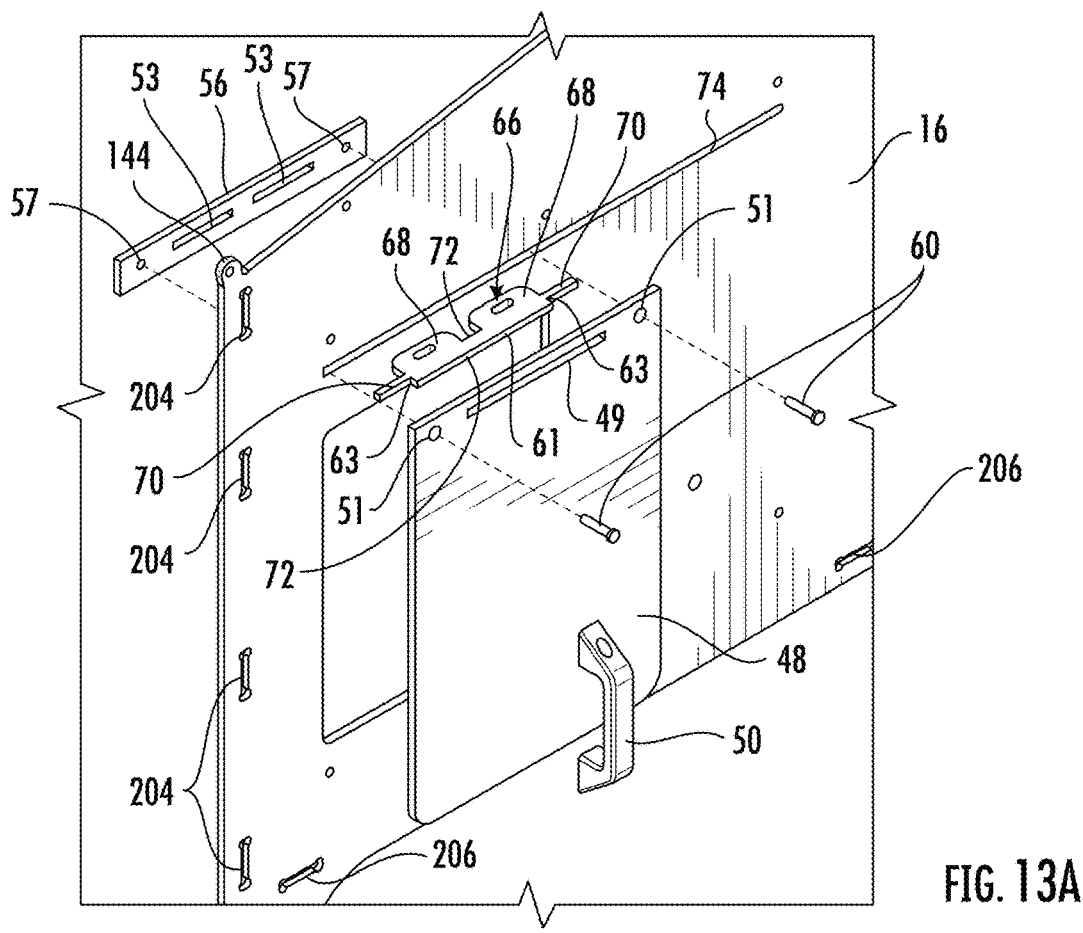
FIG. 13A is an enlarged, exploded view of a sliding door assembly viewed from the exterior of a livestock coop according to an aspect of the present disclosure.
Figure 13B:
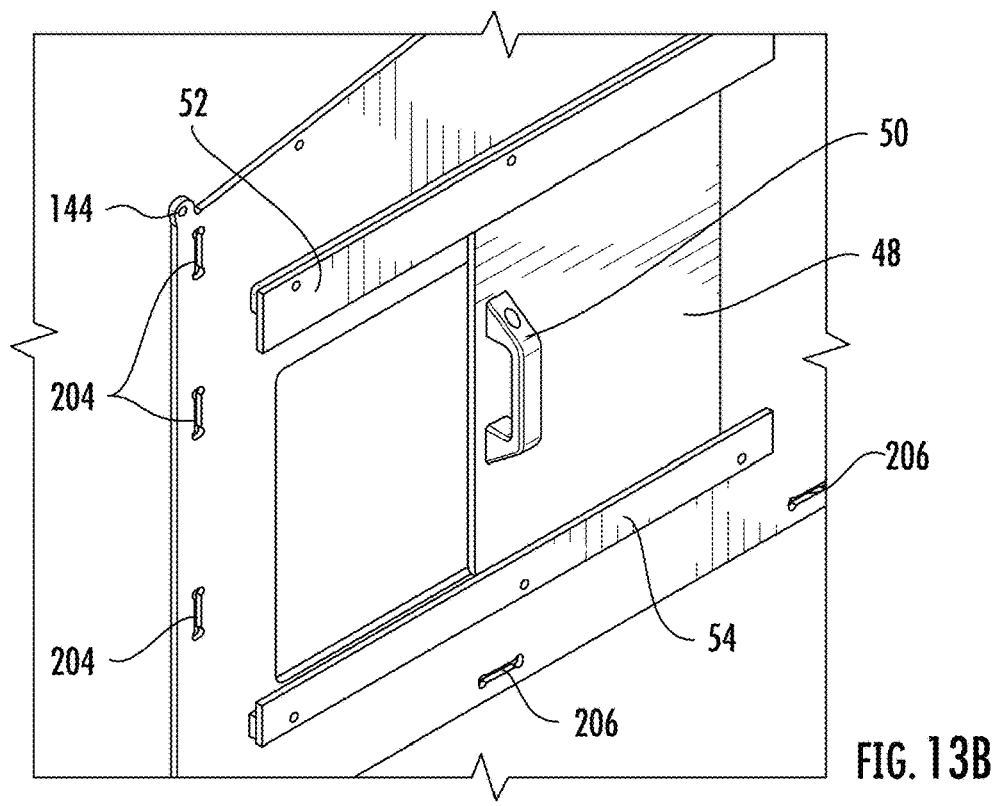
FIG. 13B is an enlarged view of a sliding door assembly in an assembled configuration viewed from the exterior of a livestock coop according to an aspect of the present disclosure.
Figure 13C:
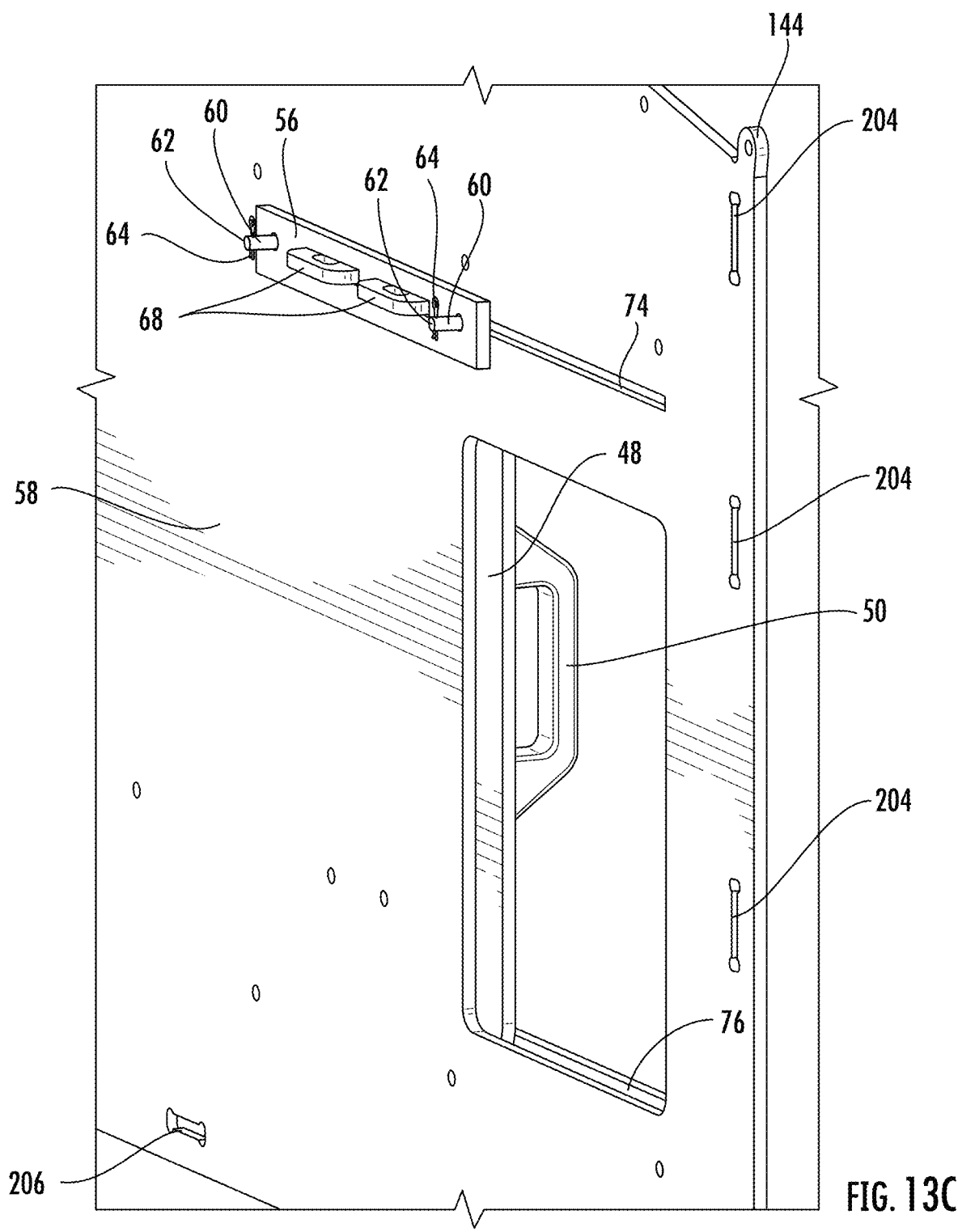
FIG. 13C is an enlarged view of a sliding door assembly in an assembled configuration viewed from the interior of a livestock coop according to an aspect of the present disclosure.
Figure 13D:
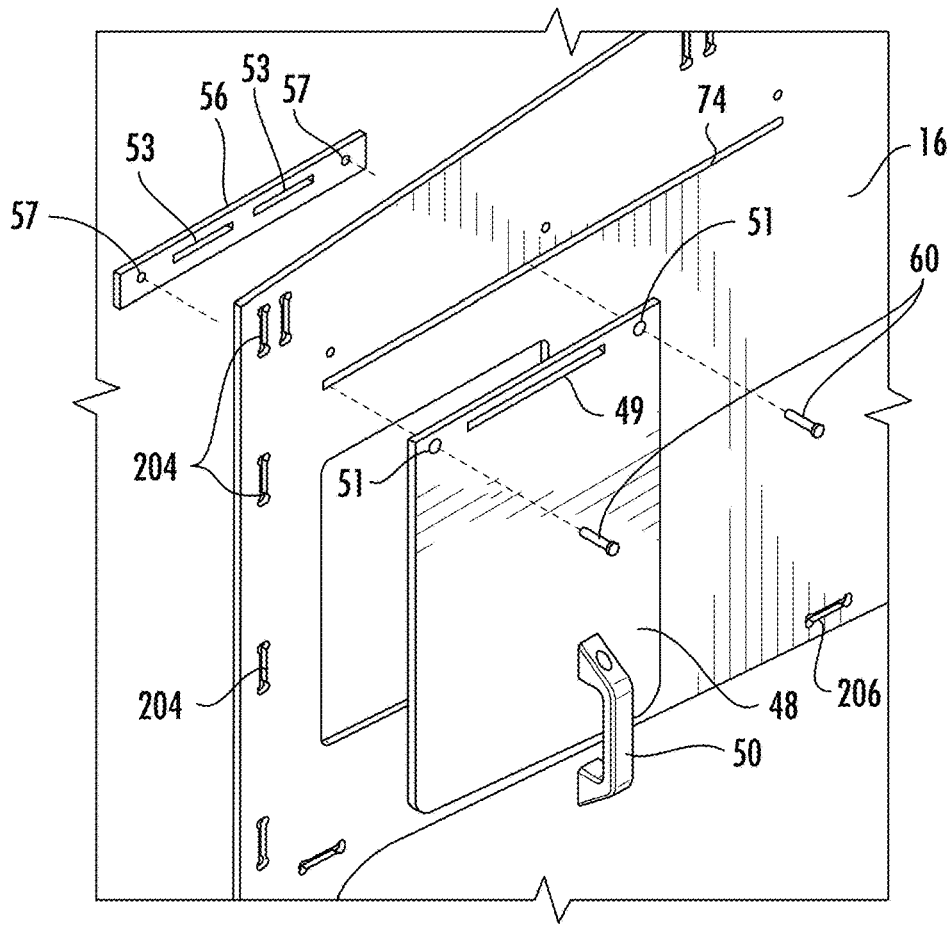
FIG. 13D is an enlarged, exploded view of another embodiment of a sliding door assembly viewed from the exterior of a livestock coop according to an aspect of the present disclosure.
Figure 13E:
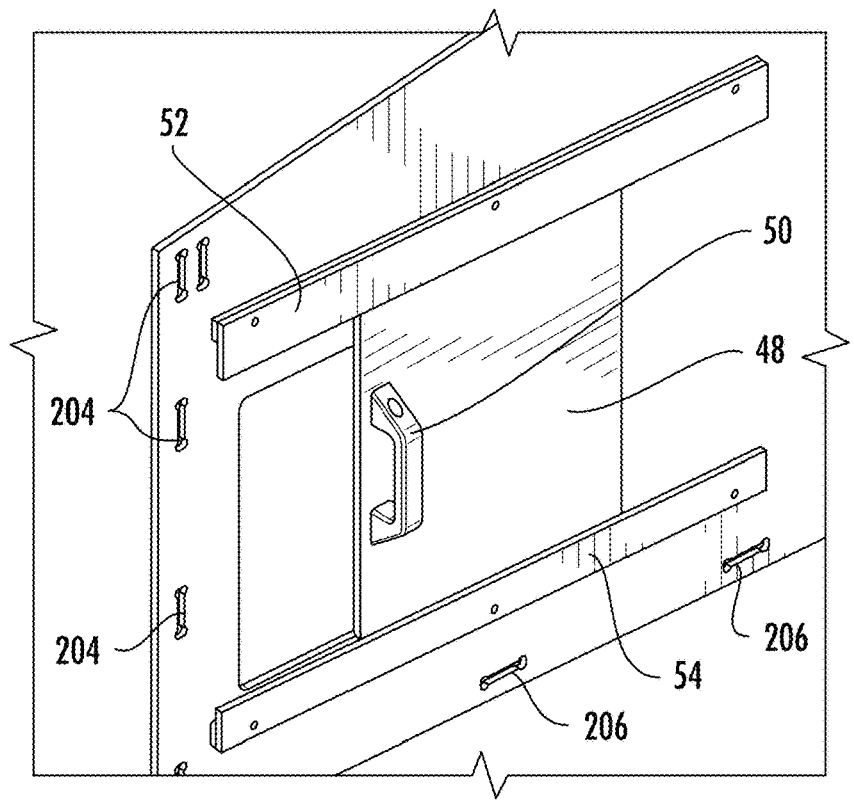
FIG. 13E is an enlarged view of a sliding door assembly shown in FIG. 13D in an assembled configuration viewed from the exterior of a livestock coop according to an aspect of the present disclosure.

As shown in at least FIGS. 1-3 and 12-13E, a livestock coop of the present disclosure also has a sliding door within a portion of the front panel 16 that also can be constructed entirely by hand and without the use of tools. The sliding door 48 typically includes a door handle 50 on the exterior-facing side of the sliding door 48 and typically utilizes a top door support panel 52 and bottom door support panel 54 along with an interior mounting bracket 56 and an optional interconnecting bracket 66 (shown in FIGS. 13A-C and omitted in the construction shown in FIGS. 13D-F). The entire assembly forms channel 76 that the sliding door 48 is locked in position and retained within and movable within a channel provided between the exterior surface of the front panel and the interior surface of both the top support panel and the bottom support panel during use. A traditional locking door mechanism may be provided proximate the handle that prevents movement of the door without a key moving the lock into the open position. The construction and assembly of the sliding door that uses an interconnecting bracket 66 is best shown in FIGS. 13A-13C. The construction and assembly of the sliding door that does not use the interconnecting bracket 66 is shown in FIGS. 13D-F. As shown in FIG. 13A, the interior mounting bracket 56 includes at least two fastener receiving apertures 57 on opposite distal ends from one another and two horizontal interior mounting bracket slots 53 extending longitudinally proximate the center of the interior mounting bracket with one slot on each side of the center of the interior mounting bracket. The interior mounting bracket receives the interior slot projections 68 of the interconnecting bracket 66 when the interconnecting bracket 66 is used. As shown in FIG. 13C, the interior mounting bracket 56 is retained in engagement with the fasteners 60 by using a cotter pin 64 spaced within a hole through a distal end 62 of the fastener 60, which may be a cotter pin receiving rounded bolt with an aperture at the distal end of the head of the bolt. The interconnecting bracket is spaced through the horizontal slot 74 in the front panel 16. As best shown in FIG. 13A, the interconnecting bracket 66, when used, typically includes at least two spaced apart interior slot projections 68 each typically having an aperture therein but may be solid as well, two laterally extending ends 70 and a center section 72 that is between the two interior slot projections. While at least two spaced apart interior slot projections 68 are typically used as shown in the figures, it is conceivable that one or more interior slot projections 68 may be utilized instead of the two shown. The interior slot projection(s) 68 extend through the horizontal slot 74 in the front panel 16 and into engagement with the horizontal slots 53 of the interior mounting bracket 56. Additionally, as best shown in FIG. 13A, the interconnecting bracket, when utilized, typically has a front facing elongated projection 61 that typically is proximate the center of the interconnecting bracket and projects a distance toward the front panel when installed such that the outward facing edge of the front facing elongated projection 61 aligns with the planar front surface of the sliding door 48 so as to provide a substantially smooth appearance to the sliding door when fully constructed and to fill the elongated aperture 49 of the sliding door. This construction also forms sliding door engaging lips 63 on each side that along with the fasteners 60 provide lateral force to the sliding door when the user applies such force using the handle.

As shown in FIG. 13A, the fasteners 60, which may be any type of fastener but are typically bolts with apertures on the distal end 62 of the fastener spaced away from the head of the bolt, when a bolt is the fastener used. The fasteners 60 are spaced through an aperture 51 in each of the upper corners of the front door of the coop. The fasteners 60 are also typically spaced within the fastener receiving apertures 57 of the interior mounting bracket 56. Again, the fasteners are held in position using a cotter pin or other similar fastener spaced within a pass-through hole in the fasteners 60. The interior slot projections 68 are typically spaced within the horizontal slot 74 of the front panel 16 positioned in the center of the portion of the sliding door's top portion so that the interior slot projections 68 and the fasteners 60 ride back and forth within the horizontal slot 74 when the door is moved from side to side and thereby provide a moving force to the overall assembly.

Figure 13F:
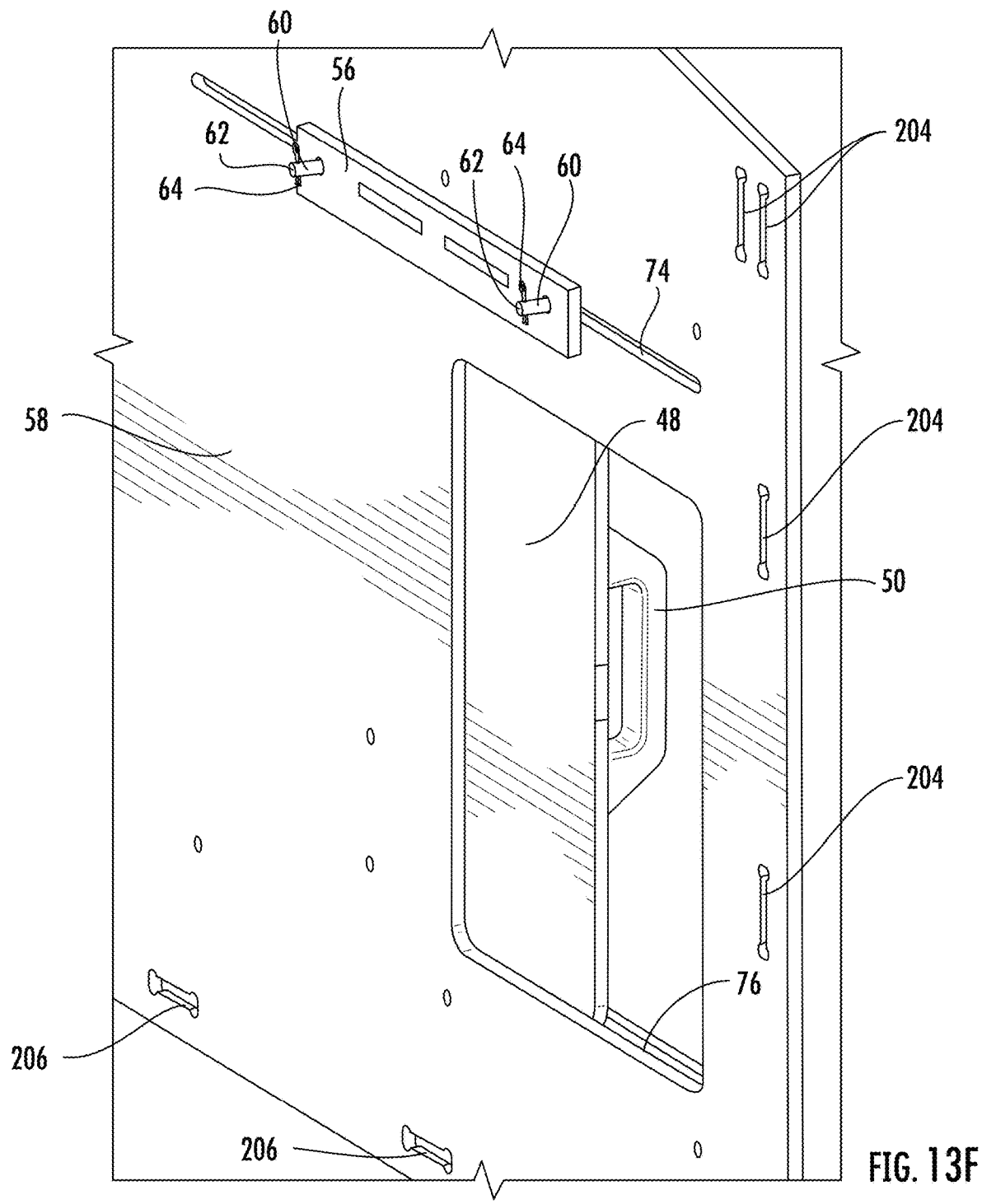
FIG. 13F is an enlarged view of a sliding door assembly shown in FIG. 13D in an assembled configuration viewed from the interior of a livestock coop according to an aspect of the present disclosure.

As shown in FIGS. 13D-F, the interconnecting bracket 66 may be omitted. While the corresponding horizontal slots in the construction shown in FIGS. 13D-F are shown in the Figures, the horizontal slots could be omitted and not included in the interior mounting bracket. In this construction, the fasteners 60 ride in the horizontal slot 74 and provide the force received from the handle to the sliding door to move/slide the door between an open position and a closed position or any point in between as needed.

Figure 20A:
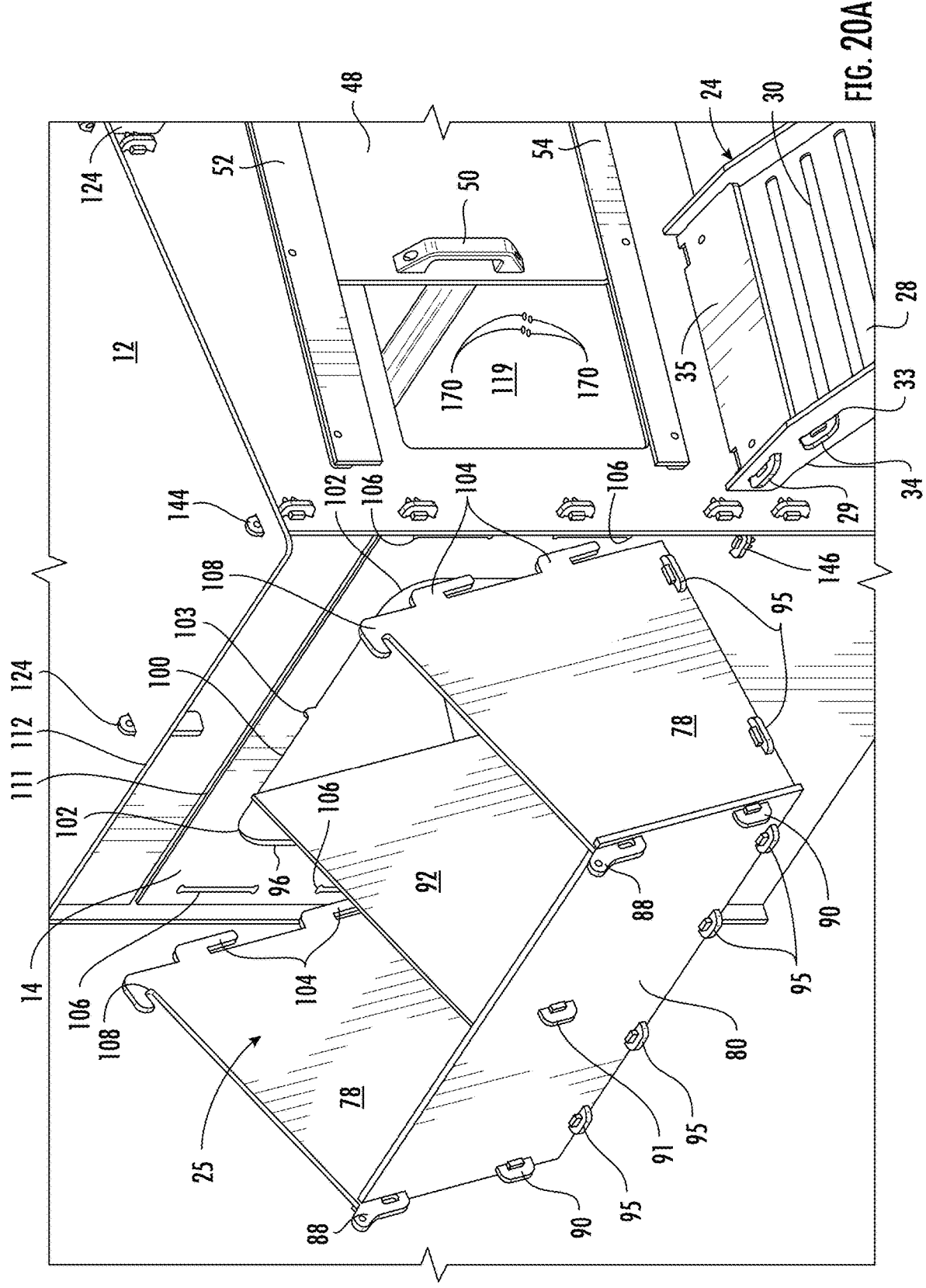
FIG. 20A is a perspective view showing the nesting chamber in an initial stage of engagement with a left side wall of a livestock coop according to an aspect of the present disclosure.
Figure 20B:
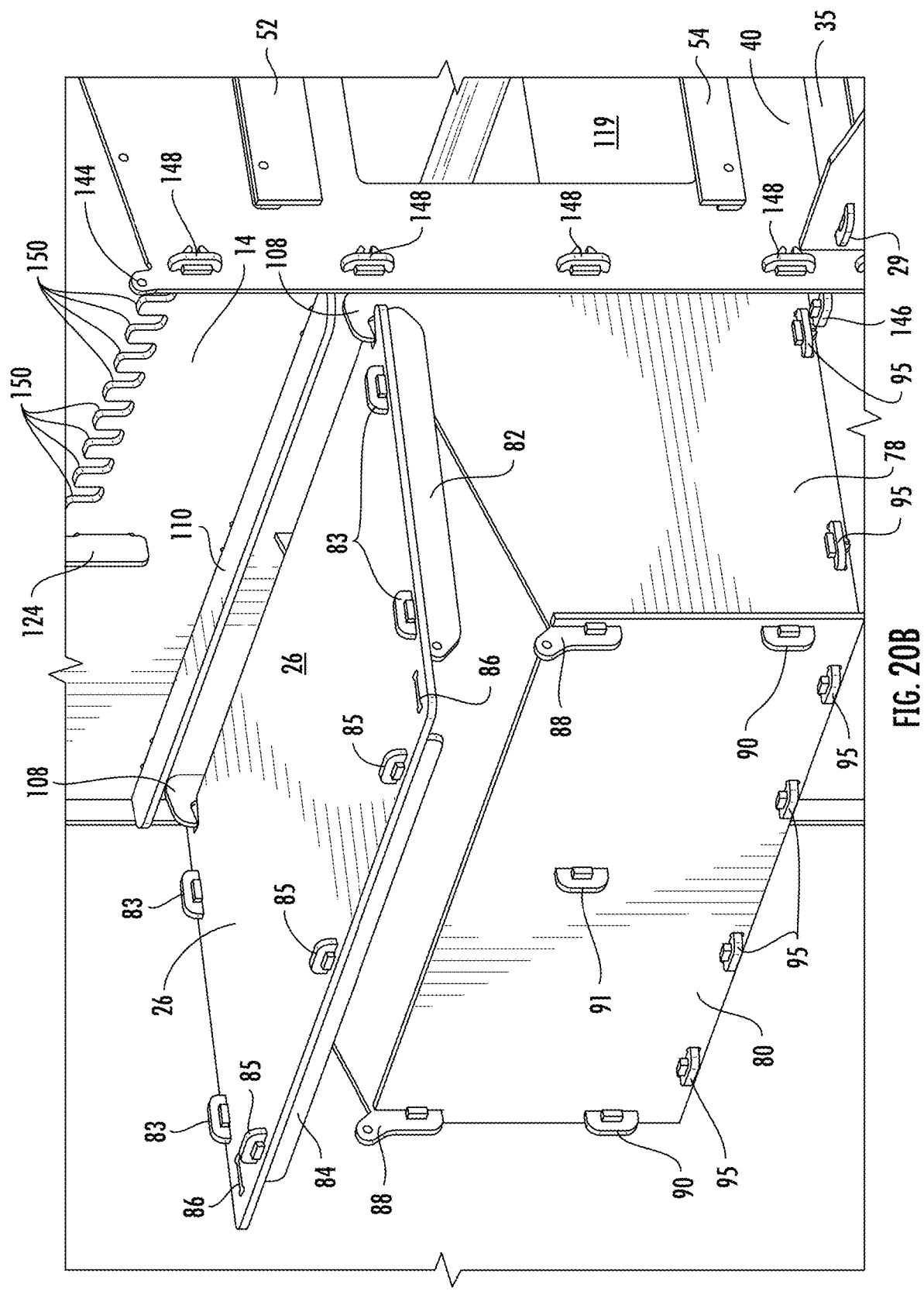
FIG. 20B is a perspective view showing the nesting chamber engaged with the left side wall and with the nesting chamber top being installed into engagement with the nesting chamber.

FIGS. 20A and 20B show two stages of the installation of the nesting chamber into engagement with the roosting chamber and the left side panel of the roosting chamber. FIG. 20A shows the installation of the main nesting areas and side walls and FIG. 20B shows installation of a typical roof construction over the top of the main nesting areas. The nesting chamber typically includes two nesting chamber side walls 78 at opposite ends of the nesting chamber 25. The nesting chamber typically includes a nesting chamber top 26, which is typically a single piece roof of the nesting chamber. The nesting chamber 25 also typically includes two nesting chamber side walls 78 on opposite ends of the nesting chamber. Each of the nesting chamber side walls 78 typically employ downwardly facing L-shaped hooks 104 that engage slots 106 in the edge portions of the left side panel and a top outwardly extending nesting chamber side wall hook 108 that retains the nesting chamber top 26 in position as shown in FIG. 20B. A downwardly extending lip wall 84 is engaged to the side of the nesting chamber top at the edge portion furthest away from the roosting chamber (see FIG. 5) and held in place using downwardly extending lip wall retention protrusions 85 that are held in place using the Pi-shaped connectors or conceivably another form/type of fastener. The nesting chamber top 26 has end wall engagement slots 86 the distal corners of the top 26 that receive the outwardly extending attachment projections on the side walls and may be held in place using a lynch pin or possibly another fastener such as a Pi-shaped connector. The Pi-shaped connectors of the present disclosure are preferred throughout the construction of the coops of the present disclosure because they are secure and can be engaged and disengaged by hand and without the use of tools. The downwardly extending lip wall helps to prevent any ingress of moisture in the form of rain or snow through the nesting chamber end wall top and the nesting chamber top 26. The nesting chamber top 26 also typically has side supports 82 that are spaced immediately adjacent the nesting chamber side walls 78 at the top of the nesting chamber side walls 78. They are held in place through the use of the Pi-shaped fasteners or another fastener that engage the side support retention protrusions 83 that extend through the nesting chamber top 26 through apertures along the sides of the nesting chamber top 26. Side supports 82 and the downwardly extending lip wall 84 principally operate as rain shields when the coop is fully constructed and in use with the top of the nesting chamber closed.

Figure 16:
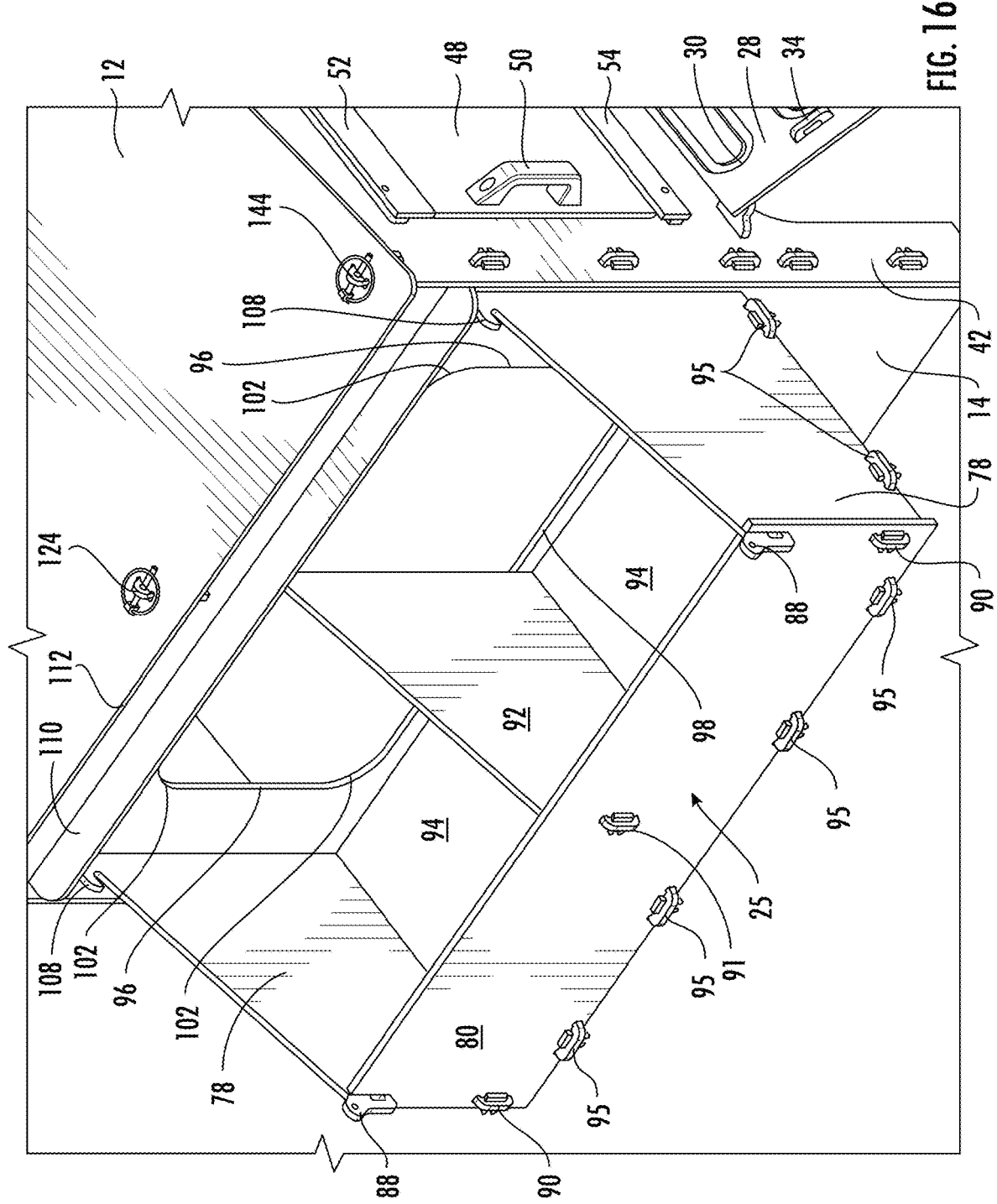
FIG. 16 is a top perspective view of the nesting chamber interior of a livestock coop according to an aspect of the present disclosure with the nesting roof removed to show the interior.

The nesting chamber end wall 80 typically engages an outwardly extending attachment projection 88 on the end opposite the top outwardly extending nesting chamber side wall hook 108 that is received in a slot with the upper left or upper right corner of the nesting chamber end wall 80. The nesting chamber end wall 80 also has a plurality of side wall engaging slots that receive projections 90 that extend through the nesting chamber end wall 80. The nesting chamber floor 94 (See FIG. 8) also has a plurality of nesting chamber floor projections 95 that extend through apertures in the nesting chamber side walls 78 and in the nesting chamber end wall 80. The nesting chamber typically further includes at least one or perhaps a plurality of nesting chamber dividers. As shown in FIG. 16, when one nesting chamber divider is used, the nesting chamber divider 92 is typically centrally located within the width of the nesting chamber. A protrusion 91 typically extends through an aperture in the nesting chamber end wall and potentially through the nesting chamber floor and held in place by a fastener. Again, these components are typically engaged by hand and without the use of tools by employing a Pi-shaped fastener of the present disclosure. However, any other fastener could also be used. A lynch pin or screw or nut and bolt fastener could be used for each location where a Pi-shaped fastener is shown and employed. Typically, a fastener that can be installed by hand and without the use of tools is employed for ease of construction after all of the components of the presently disclosed coop are shipped to the location of use from a warehouse or factory location or other retail location.

The roosting chamber typically has at least one and typically only one larger aperture leading from the roosting chamber to the nesting chamber when the nesting chamber is engaged with the roosting chamber. It is possible multiple apertures/openings may be employed to allow livestock (chicken typically) ingress and egress to the nesting chamber from the roosting chamber, however, only one is typically used. The aperture between the roosting chamber and the nesting chamber typically has a nesting chamber interior aperture vertical side edge 96 on opposite sides of the generally rectangularly shaped aperture; a nesting chamber interior aperture bottom edge 98, a nesting chamber interior aperture top edge 100, and rounded corners 102 between each of the sides of the aperture. The aperture also typically has a nesting chamber interior aperture notch 103 along the nesting chamber interior aperture top edge. This nesting chamber interior aperture notch 103 facilitates the engagement of the constructed nesting chamber into engagement with the left side panel of the roosting chamber by allowing the divider 92 to be rotated into place. A corresponding number of notches to dividers in the nesting chamber may be employed when more than one divider is used. The nesting chamber of the coop of the present disclosure typically has a floor surface area of about 28 inches by 12 inches. The nesting chamber of the present disclosure allows for the nesting chamber to be divided using one or more dividers 92 as discussed and also allow the nesting chamber to be a configured as one large, shared nest box instead of two or more separate nest boxes. Any configuration may be selected by the owner of the coop.

Figure 19A:
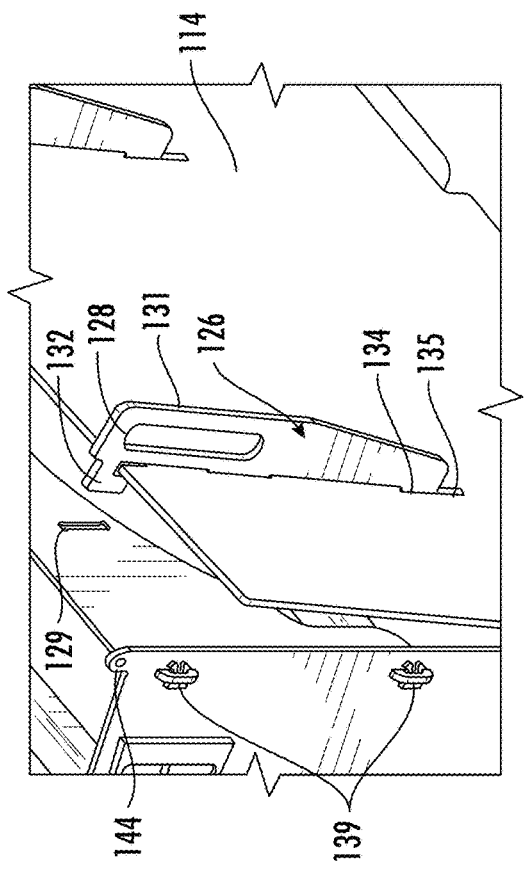
FIGS. 19A-C show stages of the removal of the side wall removable roosting chamber access panel using the side access panel handles according to an aspect of the present disclosure with FIG. 19A being the initial stage of the removal, FIG. 19B being an intermediate stage, and 19C where a user is starting the actual removal of the side wall.

A moisture shield 110, which prevents snow and rain and other moisture from falling off the roof of the roosting chamber and into the nesting chamber or the gap therebetween is typically mounted within a moisture shield slot 111 (See FIG. 19A). A plurality of spaced apart fasteners may engage the side of the moisture shield or the moisture shield may be frictionally held within the moisture shield slot 111 or held with one or more adhesive. The nesting chamber covering edge 112 of the roof 12 typically extends a distance past the plane defined by left side panel's exterior surface and typically extends past the edge of the moisture shield most distal from the roosting chamber, but may be shorter such that moisture drips off the roosting chamber's roof 12 and onto the moisture shield 110. The moisture shield is typically angled downward to utilize the force of gravity to drive water away from the roosting chamber, but could conceivably be level with the ground surface. However, level would be less preferred as this may accumulate snow or other solid forms of moisture. Uniquely, the roof 12 of the roosting chamber is a planar roof with the roof angled downwardly toward the nesting chamber. The angle of the roof 12 is typically about 8 to about 12 degrees shown as degree B in FIG. 3 and more typically about or exactly 10 degrees. Similarly, the nesting chamber top 26 is angled at a larger angle A than that of angle B. Angle A is typically from about 15 to about 20 degrees, more typically from about 18 to about 19 degrees and most typically about 18 degrees or exactly 18.4 degrees. The roof of the roosting chamber and the nesting chamber top are typically matching grey textured roofs. As with all of the surfaces of the present coops, even if the exterior of a given surface is textured or created to have a wood grain finish, their inner surface remains smooth and with no manually added texturing and design, which ensures easy cleaning of all interior surfaces. The roof of the roosting chamber and the nesting chamber top are designed with a gentle slope to effectively shed rainwater, keeping chickens and nesting materials dry. The moisture shield (rain shield) 110 positioned between the two roofs to prevent water ingress-thus solving a major problem that most other coops experience.

Figure 2:
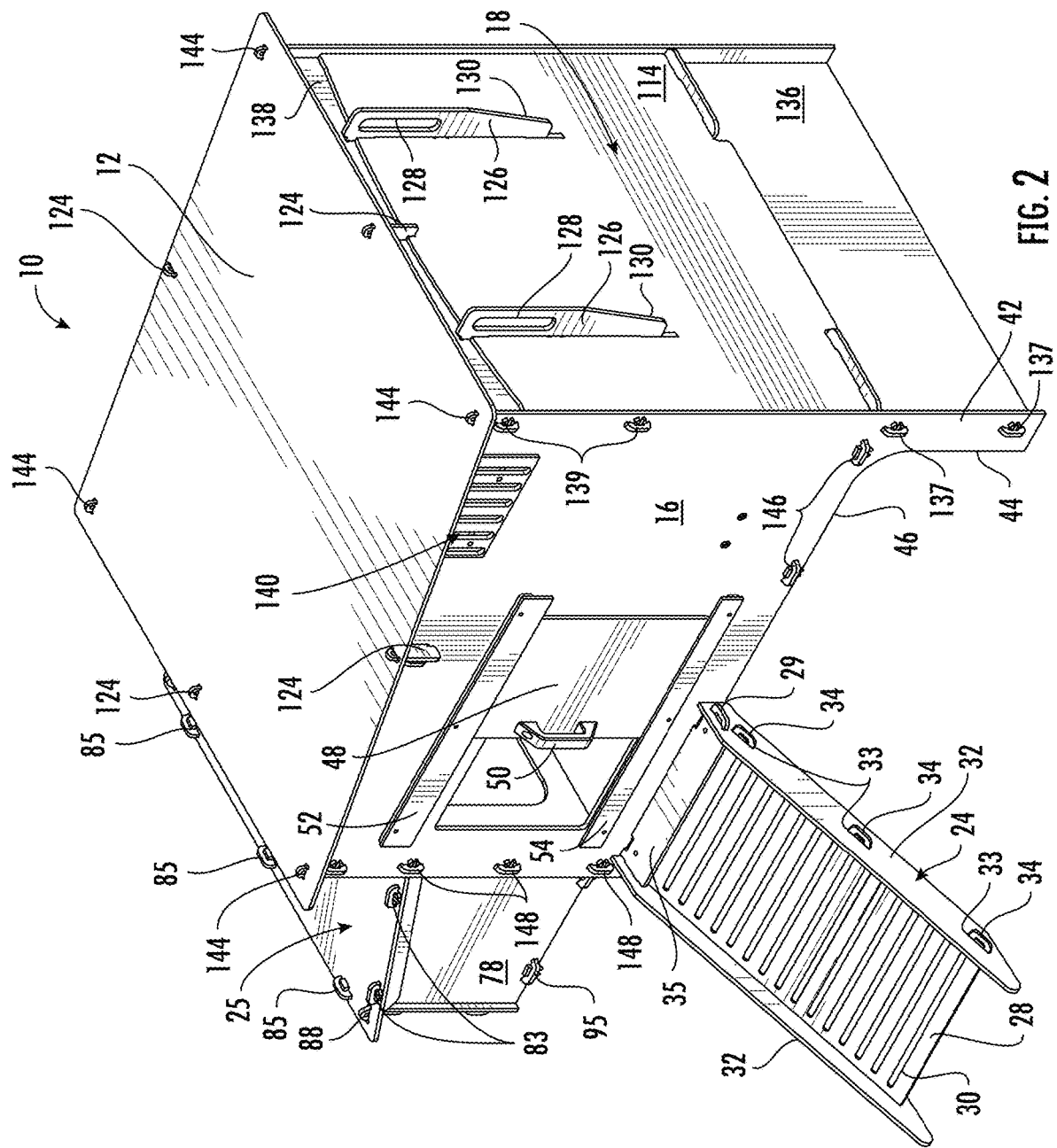
FIG. 2 is a front, upper right perspective view of a livestock coop according to an aspect of the present disclosure.
Figure 3:
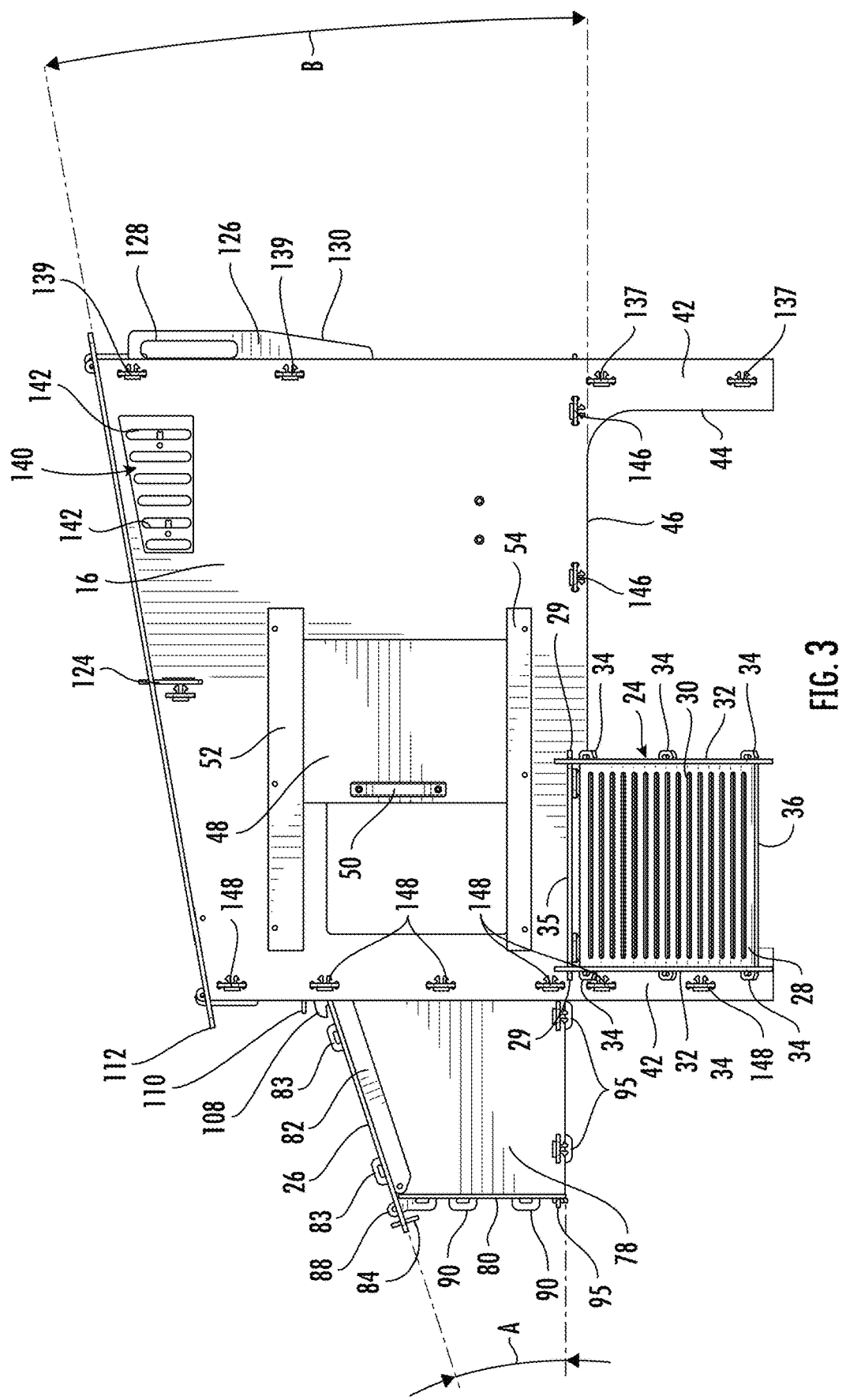
FIG. 3 is a front view of a livestock coop according to an aspect of the present disclosure.

As shown in at least FIGS. 2 and 12, the roof 12 of the roosting chamber typically extends past the plane defined by the exterior surface of the right side panel 18, which also has an interior facing surface 58. Additionally, coops of the present disclosure typically have a right side panel removable roosting chamber access wall portion 114 that is capable of being removed to facilitate cleaning of the roosting chamber by power washing or other cleaning methods. The right side panel removable roosting chamber access wall portion 114 has access panel floor engaging protrusions 116. The roosting floor projections 117 typically extend from the roosting chamber floor 119 past the plane defined by the exterior surface of the right side panel bottom section 136. The access panel floor engaging protrusions 116 typically engage roosting floor notches 118 in at least two roosting floor projections 117, which are typically located on opposite sides of the coop proximate the front panel 16 and back panel 20. While two roosting floor projections are typically used, it is conceivable that a single typically centrally located access panel floor engaging protrusion having one or a plurality of apertures therein could be used instead that receives one or a plurality of access panel floor engaging protrusions typically centrally located and extending from the right side panel removable roosting chamber access wall portion 114. A portion of the right side panel removable roosting chamber access wall portion 114 typically extends past the plane of the roosting chamber floor 119. This helps prevent water or other moisture from entering the roosting chamber and instead directs any water or moisture to outside the coop.

Figure 4:
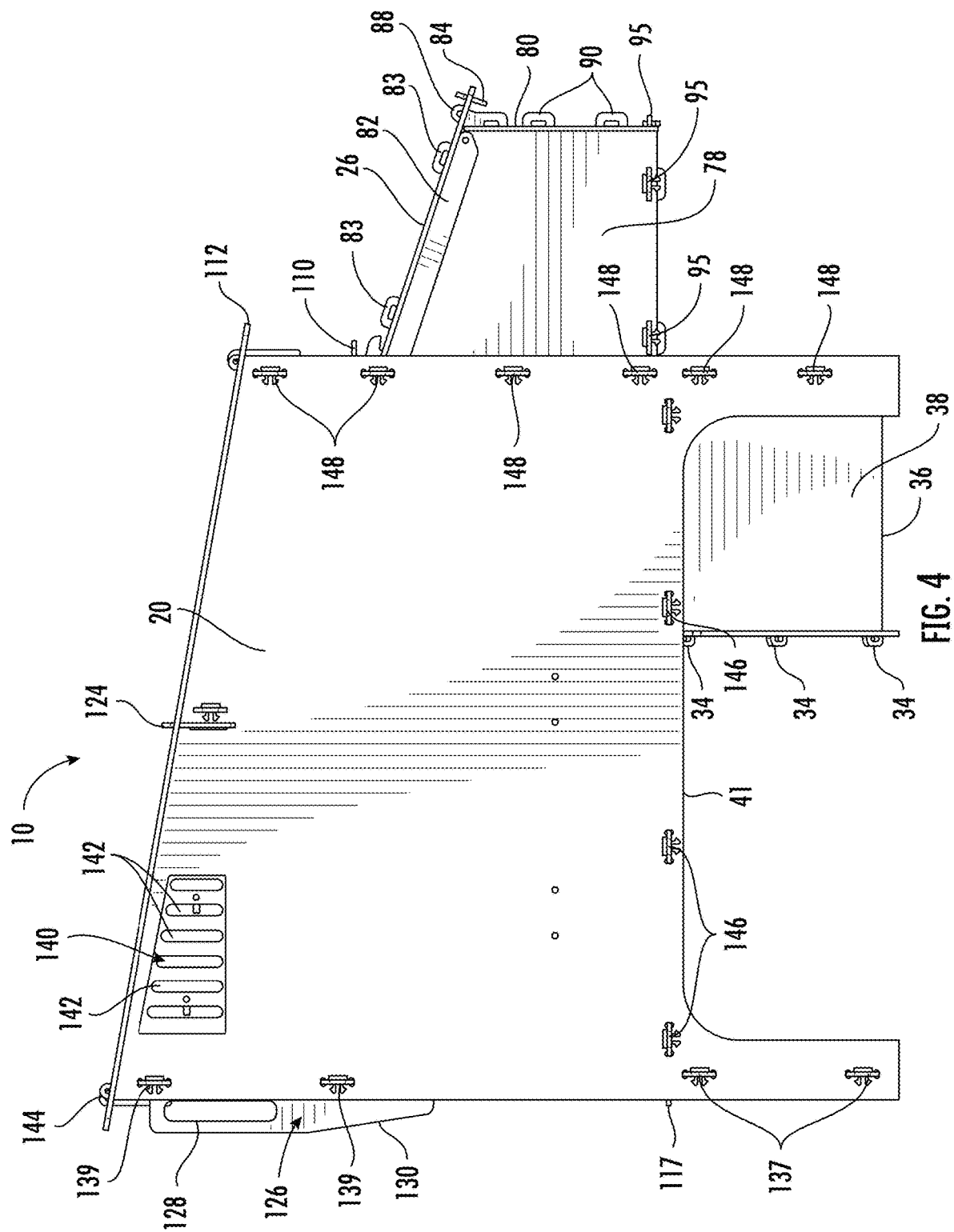
FIG. 4 is a back view of a livestock coop according to an aspect of the present disclosure.

As also seen in at least FIG. 4, the highest edge of the roof 12 extends over the plane defined by the exterior surface of the right side panel 18 and may align with the furthest point/edge of the notches 118 or extend beyond. This provides even greater protection from the elements while still allowing for easy removal of and access to the right side panel removable roosting chamber access wall portion 114 and use of the side access panel handles. The roof would not typically extend more than about one to 12 inches, more typically from about 2 to about 6 inches past the plane of the exterior surface of the right side panel 18.

The right side panel removable roosting chamber access wall portion 114 typically has an arched top 120 and a top notch 122 that engages a roof mounting planar support 124 that is centrally located on the arched top section 138 of the right side panel 18 such that the right side panel removable roosting chamber access wall portion 114 matingly engages arched top section 138. The right side panel 18 typically also has a rectangular bottom section 136. The rectangular bottom section 136. The rectangular bottom section 136 typically has right side panel bottom section lockable protrusions 137. The right side panel top section 138 typically has right side panel top section lockable protrusions 139. These protrusions extend through apertures in the surfaces they engage and are typically held in place using the Pi-shaped connectors/fasteners of the present disclosure or another fastener, typically another fastener that engages and disengages by hand and without the use of tools.

Figure 18:
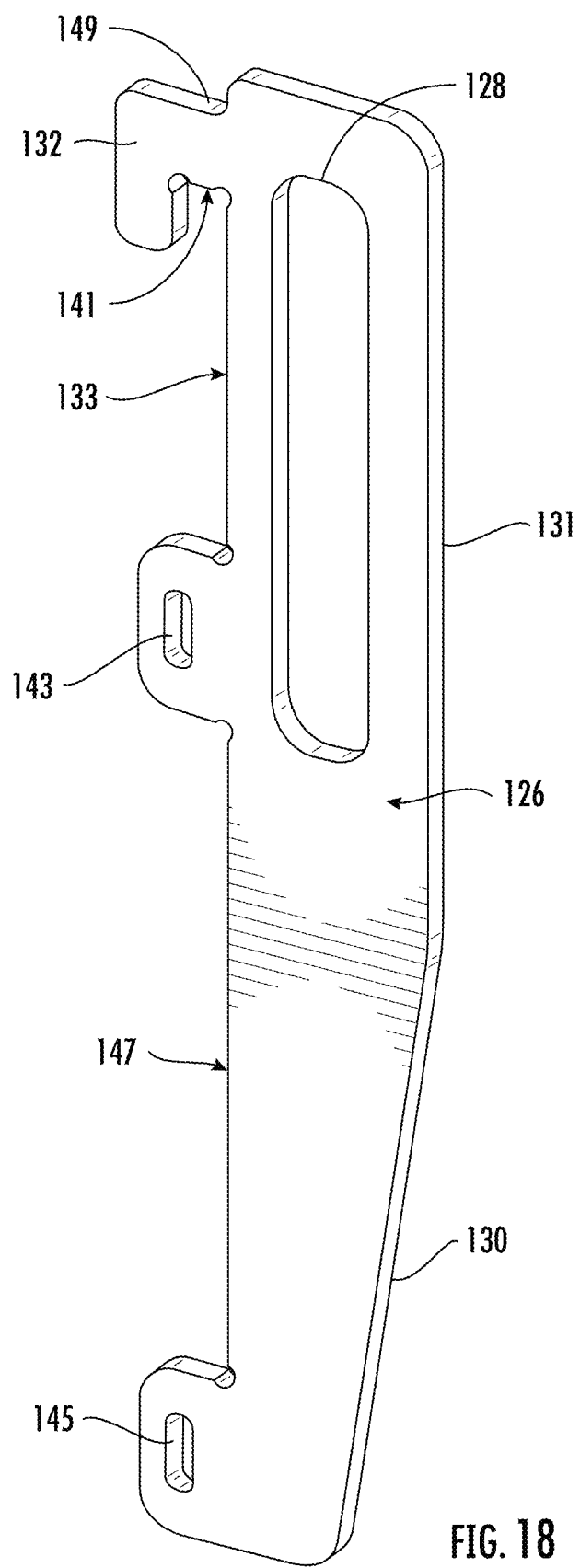
FIG. 18 is a perspective view of a side access panel handle according to an aspect of the present disclosure.
Figure 19B:
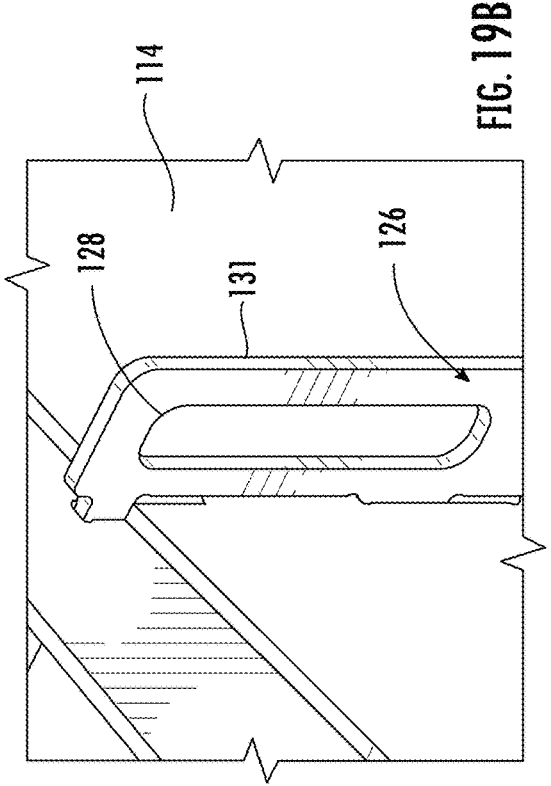
Figure 19C:
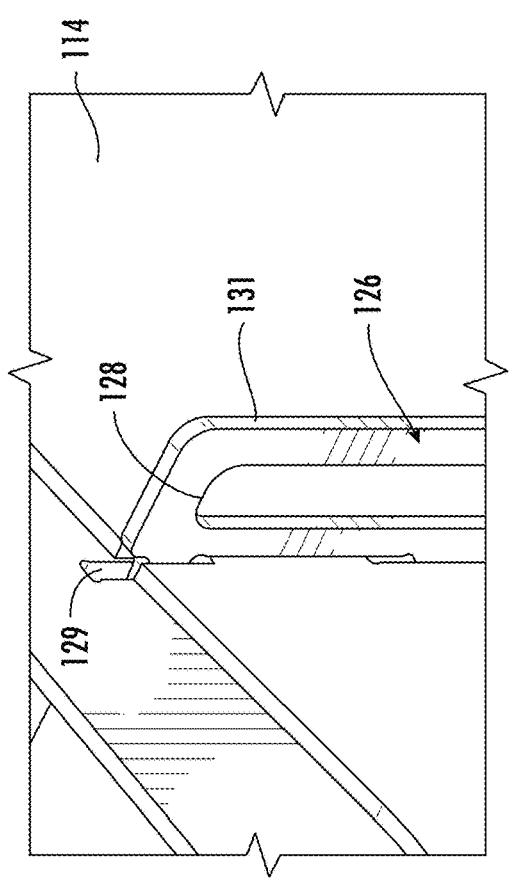

One or more users may remove the right side panel removable roosting chamber access wall portion 114 using the two or more side access panel handles 126 (See FIGS. 18-19C). The side access panel handles 126 typically have a hand receiving aperture 128 in the top half of the side access panel handle. The side access panel handles also typically have an angled bottom portion 130, a top portion 131, a downward-facing L-shaped hook portion 132 extending from proximate the top 149 of the side access handles, and interior top cutout 133, and a bottom portion upward facing L-shaped hook 134 that engages the access panel 114 when the handle is lifted upward to help a user control the access panel as it is being engaged and disengaged. The side access panel handles 126 also typically have an upper notch 141 between the downward-facing L-shaped hook portion 132 and the hand receiving aperture 128. At the bottom of the interior top cutout 133 is an intermediate projection 143 that has a cutout therein. Downward from the intermediate projection 143 is an interior bottom cutout 147, which extends down to a bottom projection 145 that also has a cutout. As shown in FIGS. 19A-C, a user can lift the side access panel handles 126 and the construction/design of the handles 126 lifts the downward-facing L-shaped hook portion 132 from engagement with the slots 129 in the right side panel top section and the upper notch 141 supports secure engagement of the access panel along with the interior top cutout 133 and the interior bottom cutout 147 to provide support for the exterior surface of the side access panel as the user(s) lift the panel from engagement or into engagement with the rest of the right side panel 18. The side access panel handles may be removed from engagement with the side access panel by hand and without the use of tools when the side access panel is disengaged from the coop. They may be reengaged when the side access panel is to be reinstalled such as after cleaning of the side panel and/or the interior of the coop. As discussed throughout the present disclosure, the construction design of the coops of the present disclosure allows for easy assembly and disassembly for cleaning, flat shipping of all component parts in one packaging box or crate, assembly and disassembly of all or at least 90% of the coop by hand and without the use of tools, and the use of up to 70% by weight recycled plastic material that has an outward textured pattern placed therein if one wishes and a flat, easy clean, interior surface.

Figure 5:
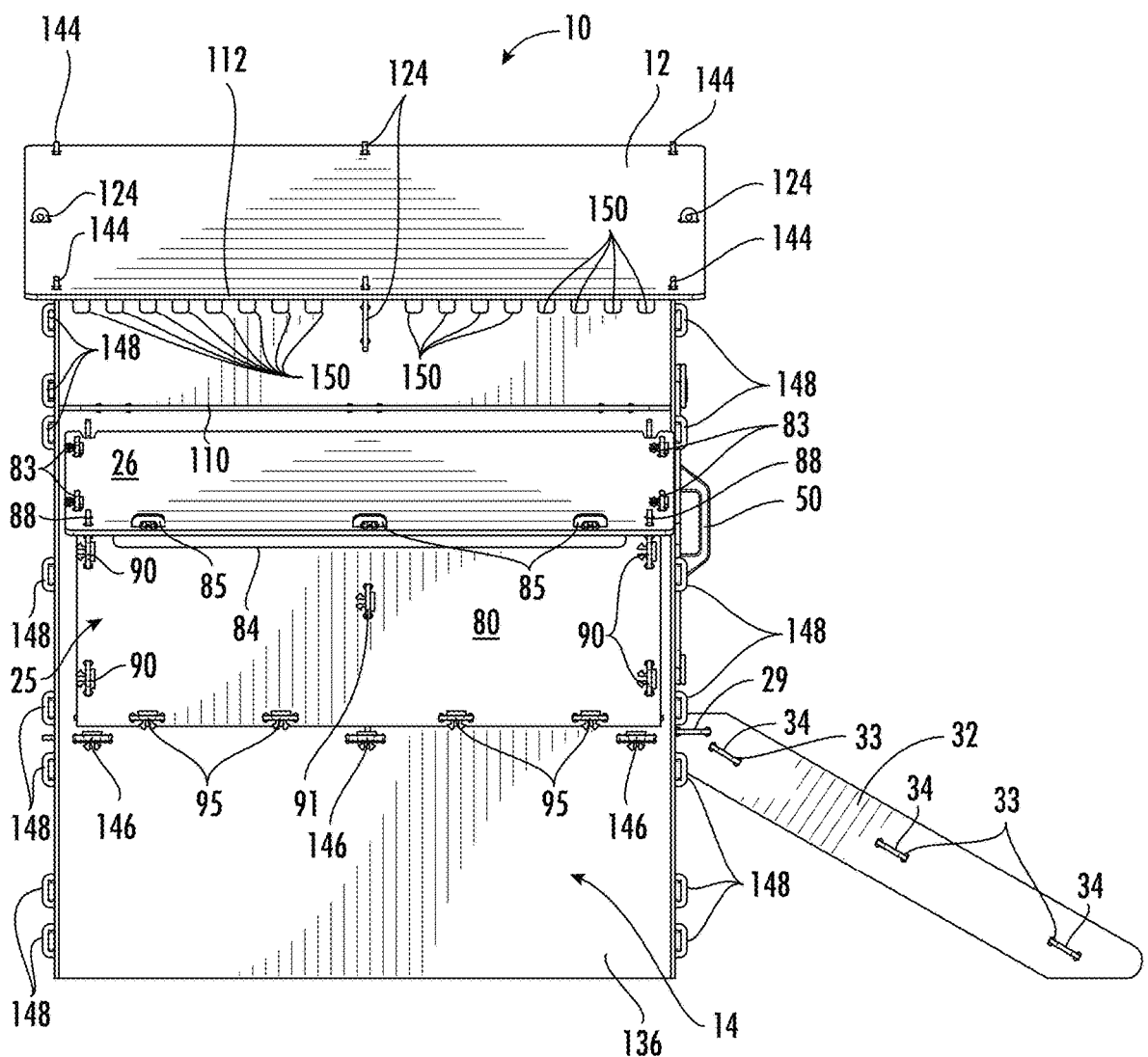
FIG. 5 is a left side view of a livestock coop according to an aspect of the present disclosure.
Figure 6:
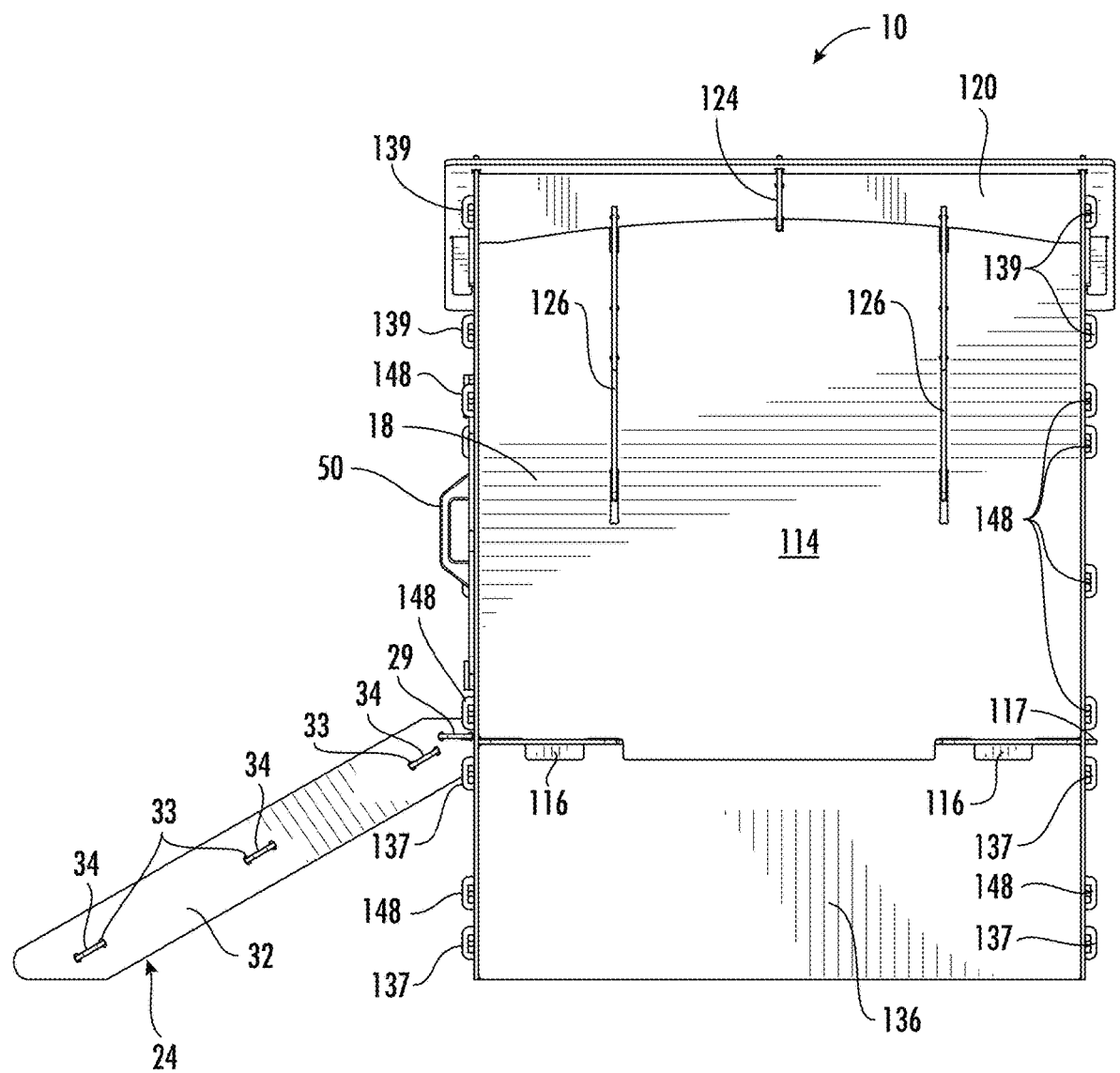
FIG. 6 is a right side view of a livestock coop according to an aspect of the present disclosure.
Figure 7:
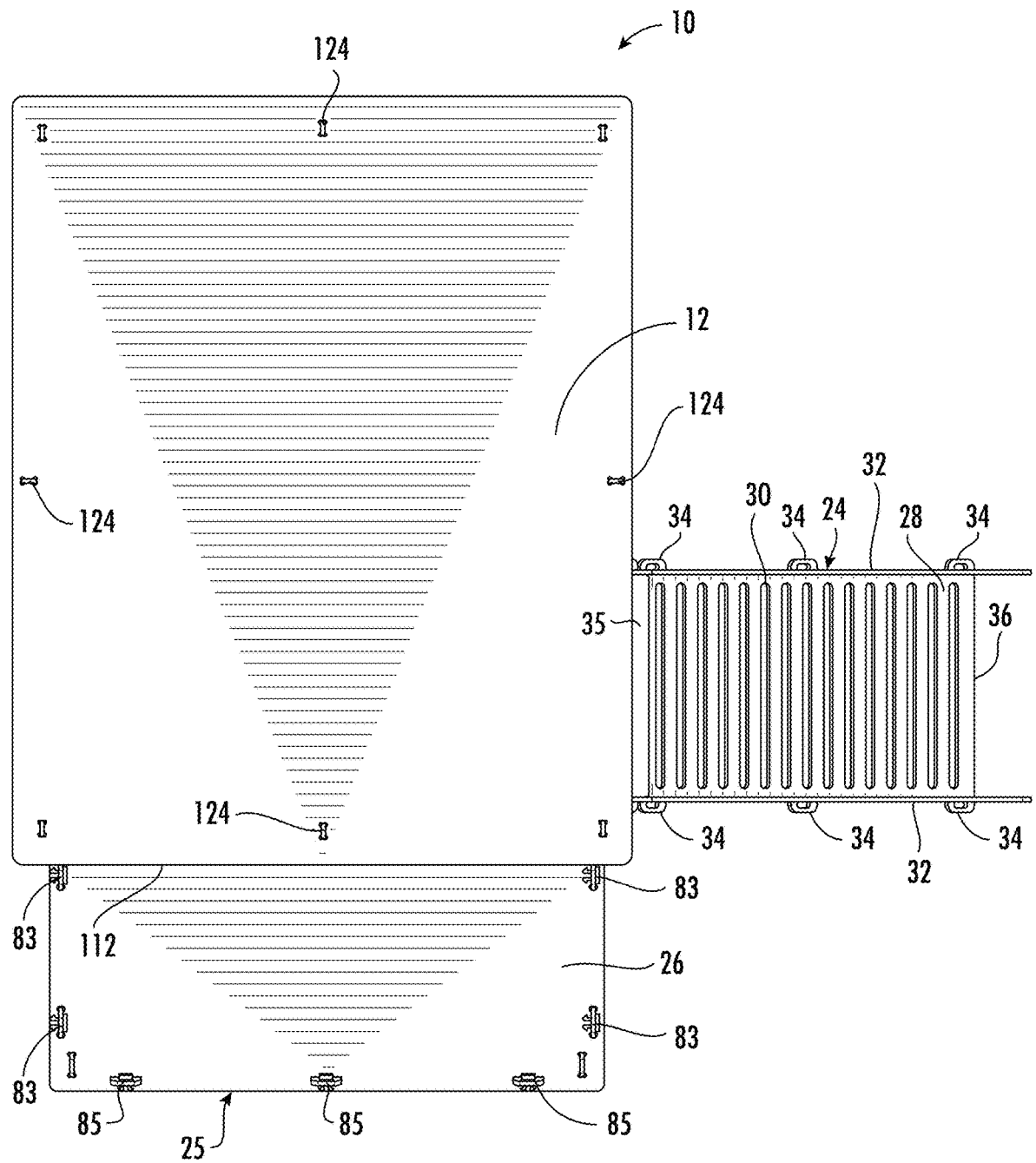
FIG. 7 is a top view of a livestock coop according to an aspect of the present disclosure.
Figure 8:
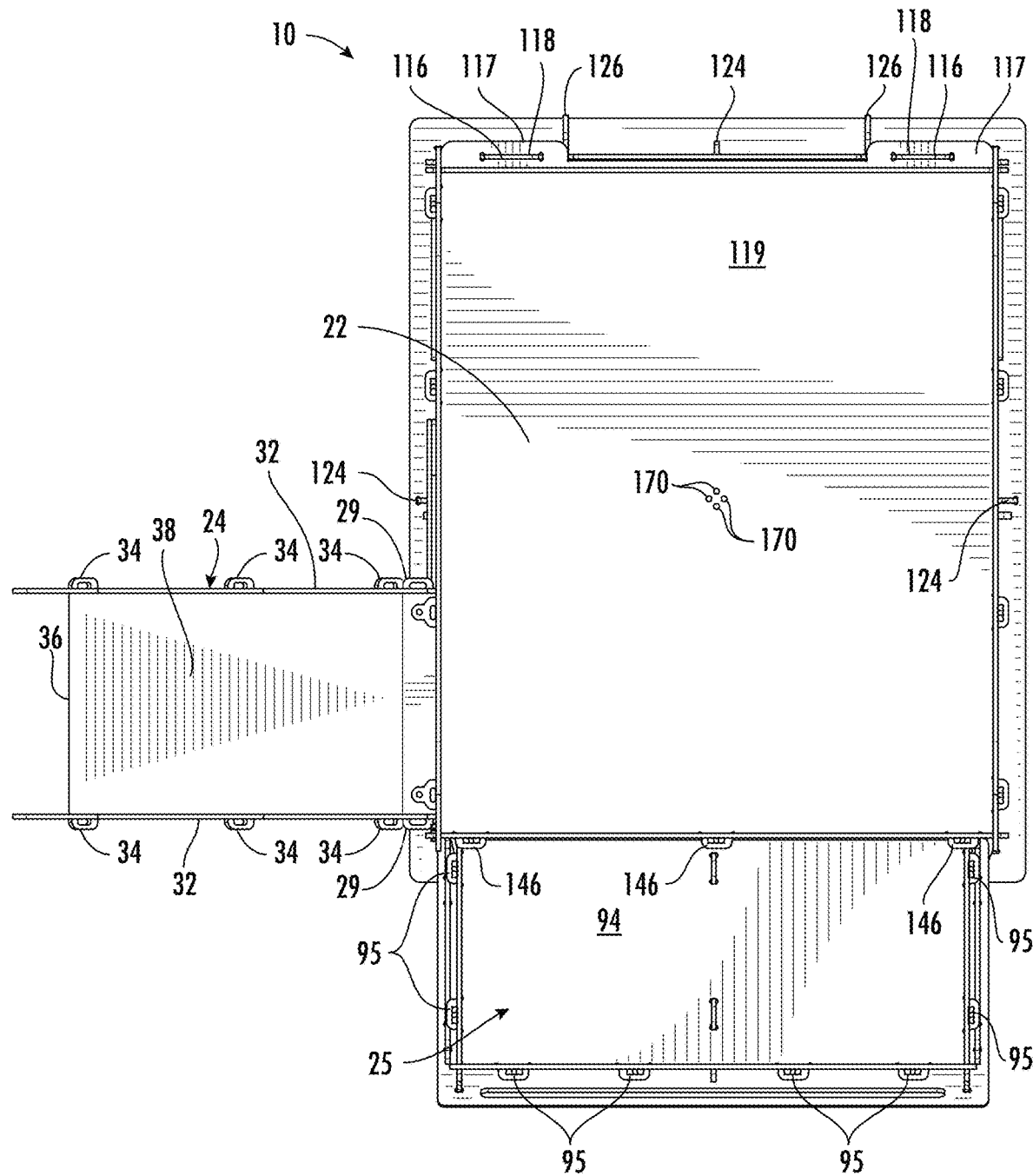
FIG. 8 is a bottom view of a livestock coop according to an aspect of the present disclosure.
Figure 9A:
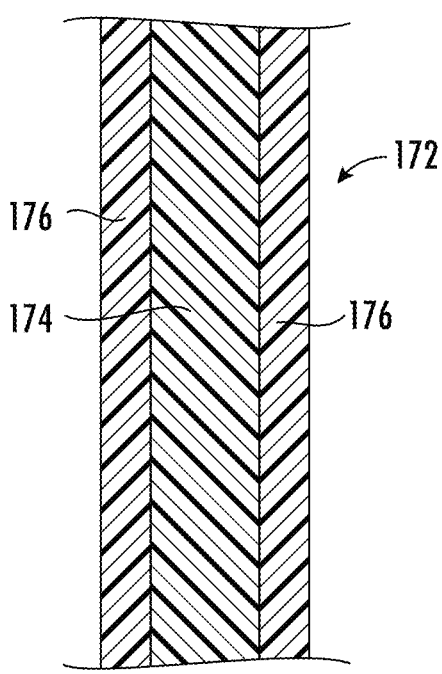
FIG. 9A is a cross-section view of a composite wall used to produce a livestock coop according to an aspect of the present disclosure.
Figure 9B:
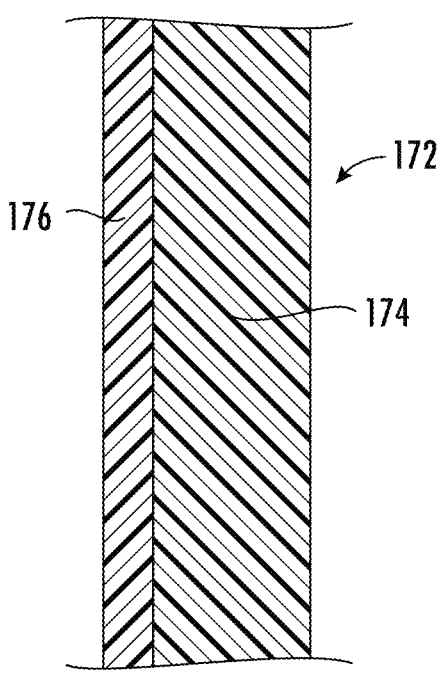
FIG. 9B is a cross-section view of a composite wall used to produce a livestock coop according to an aspect of the present disclosure.
Figure 10A:
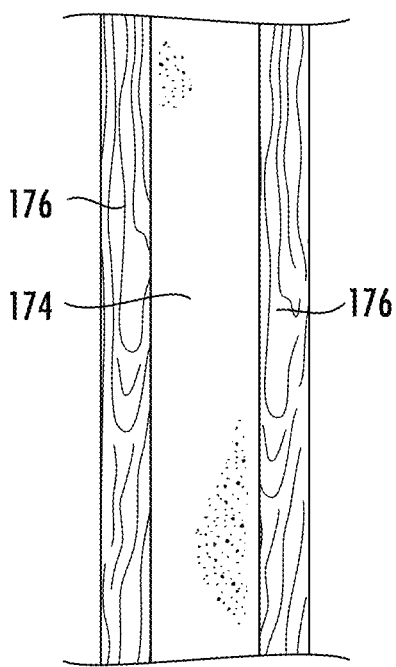
FIG. 10A is a cross-section view of a composite wall used to produce a livestock coop according to an aspect of the present disclosure showing the aesthetic appearance of wood grain in the outer plastic portion of the composite on both sides of the composite and the center section having recycled plastic as the interior portion. The wood grain texturing is shown throughout in the Figure, but would be a surface texturing applied to the exterior facing surfaces of the composite. The wood grain texturization may be replaced with any pattern or texturization if preferred by the end purchaser or user of the coop allowing for some customization of the unit parts and the overall unit's external appearance.
Figure 10B:
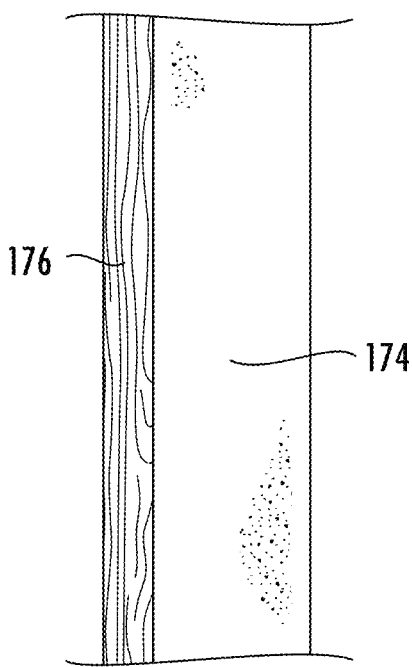
FIG. 10B is a cross-section view of a composite wall used to produce a livestock coop according to an aspect of the present disclosure showing the aesthetic appearance of wood grain in the outer plastic portion of the composite on one side, which is typically the exterior facing side viewable by humans during use of the coop with the center section having recycled plastic as the interior portion. The wood grain texturing is shown throughout in the Figure on one side, but would be a surface texturing applied to the exterior facing surfaces of the composite. The wood grain texturization may be replaced with any pattern or texturization if preferred by the end purchaser or user of the coop allowing for some customization of the unit parts and the overall unit's external appearance.
Figure 15A:
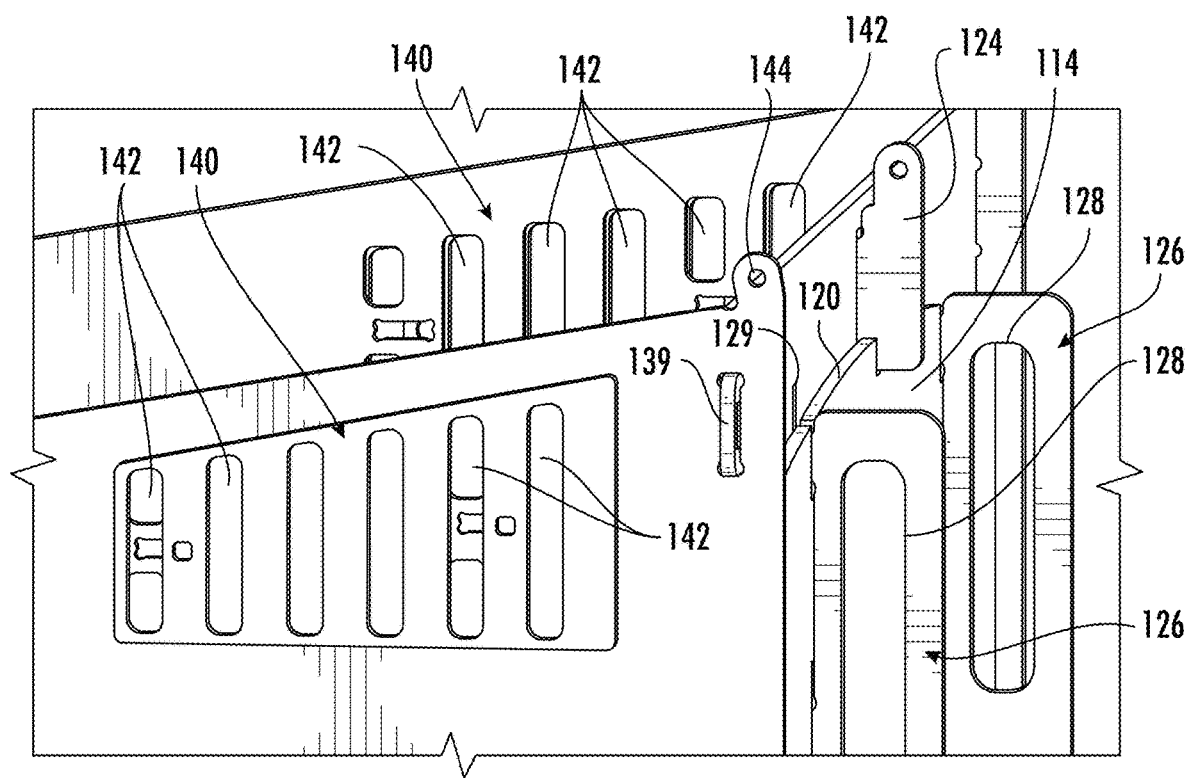
FIG. 15A is an enlarged view of a side air venting system of a livestock coop according to an aspect of the present disclosure with the venting slots in an open/first position.
Figure 15B:
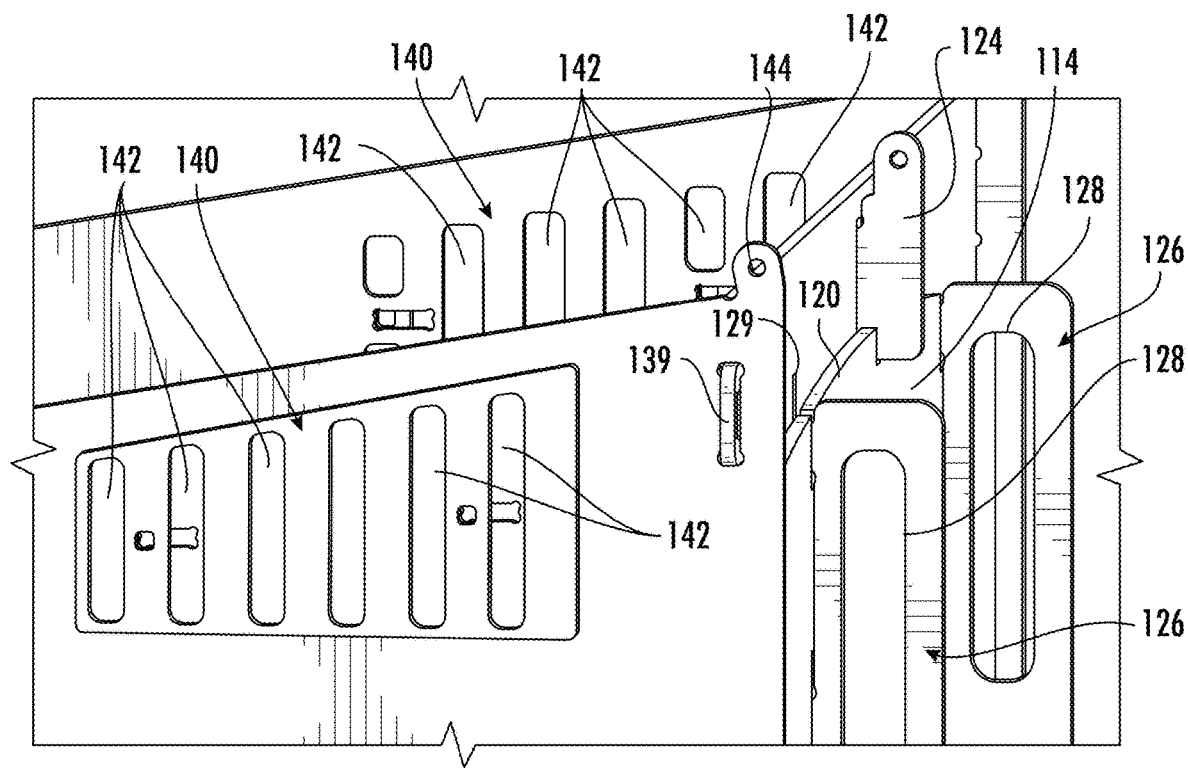
FIG. 15B is an enlarged view of a side air venting system of a livestock coop according to an aspect of the present disclosure with the venting slots in a closed/second position.

The coops of the present disclosure ensure optimal ventilation. A crenelation cut in the left side panel that creates top air ventilation notches 150 in the left side panel as shown in FIG. 5 and two ventilation systems 140 located higher up on the front and rear panels work together to provide airflow out of the coop of warmer air. The two higher ventilation systems are adjustable, to suit different weather conditions. Each of the air ventilation systems 140 include venting slots 142 that may be open, partially open or closed by sliding a cover. This sliding feature where an interior slide is moved between a first and second position where the venting slots are open (FIG. 15A) and closed (FIG. 15B) is best shown in FIGS. 15A-B.

The side panels of the coops of the present disclosure typically have side panel roof engaging protrusions 144 proximate the top of the side panels that typically extend through apertures in the roof 12. The roosting floor 119 typically has roosting floor protrusions 146 that extend through apertures. The roosting floor protrusions 146 may extend through any of the front panel, the left side panel (See FIGS. 5 and 8), the right side panel (although not typically the right side panel) and the back panel. The left side panel has wall retention protrusions 148 that engage the left side panel with the front panel 16 and the back panel 20 of the coop 10 and pass-through apertures such as vertically oriented apertures 204 and horizontally oriented apertures 206. The roosting chamber floor may also have one drain hole 170 or a plurality of spaced apart drain holes 170 that allow for even easier cleaning of the interior of the coop of the present disclosure. There will be no standing water when the coop is cleaned. Additionally, in the unlikely event that water or snow enters the roosting chamber of the present disclosure, the water has a means of escape without damaging the inhabitants of the coop or the nesting material that may be within the coop. Additionally, as mentioned previously, all or substantially all of the interior facing surfaces of the coop are smooth to facilitate cleaning. The interior surfaces are also typically black colored, but could conceivably be any color. The interior surfaces do not have any intentionally textured features, but is purposefully smooth without grooves or texturing of any kind.

As shown in FIGS. 9A-10B, the walls, roofs, floors and other flat planar surfaces of the livestock coop of the present disclosure may be a composite wall 172 made from recycled plastic that can be in any color. This is being done by a process whereby the plastic is extruded using a triple feed extruder (see FIGS. 9A and 10A). The central feed 174 is typically a molten black 100% recycled plastic that solidifies as it cools, and the two external feeds 176 are typically a virgin plastic, which is better able to be form such that it has an external texturing such as a wood grain pattern and/or coloring or possibly a pattern of colors on the external feed(s). The central feed is typically up to about 5 to about 70% by weight of the composite material, more typically from about 50-70% by weight of the composite material and most typically about 68% to 70% by weight of the composite material. The two outside feeds are typically substantially the same thickness with each outside feed typically being about 15% to 16% of the overall weight percent of the structural component being produced. The overall plastic component is thus made from up to about or exactly 70% recycled material. The structural components may also be produced so that the color component is on one face only (see FIGS. 9B and 10B) with typically a black plastic forming the interior-facing/other face side. As such, the chicken coop may be constructed of up to 70% recycled plastic material by weight and yet still be in a customer selected color on at least the exterior facing side if not both the interior and exterior sides of the structural components of a coop of the present disclosure.

Additionally, two new imprint roller drums may be used. One of these is able to provide a textured finish that enables the plastic color to take on the shade and hue of pastel colors, and another imprint roller drum that can impress a wood grain look finish onto the plastic as it is being extruded/formed. With these systems, a recycled plastic, wood look, appearance may be formed and used to produce structural components for a livestock coop according to the present disclosure. The panels created using the wood grain roller may have the appearance of wood painted in various colors and shades. Typically, the livestock, typically chicken coops, of the present disclosure may have a dual color scheme, with the top of the roof of the roosting chamber and the nesting chamber and the ventilation openings in the sides and the sliding door being one color, which is typically green, more typically a sage green, and the remaining exterior facing surfaces a different color, typically a gray color. However, it should be appreciated that any color scheme could conceivably be employed and each individual part may be a different color if the user so wished.

Figure 14A:
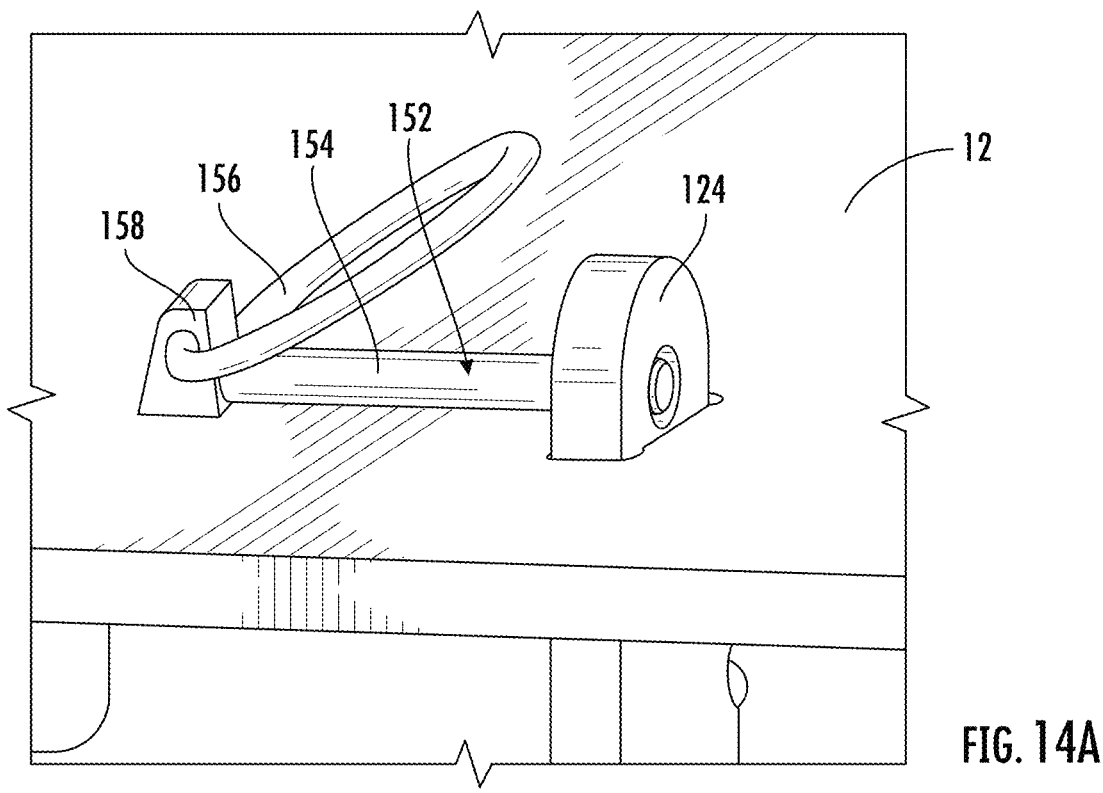
FIG. 14A is an enlarged view of a latch pin assembly that is used to engage components of a livestock coop according to an aspect of the present disclosure in an initially engaging position.
Figure 14B:
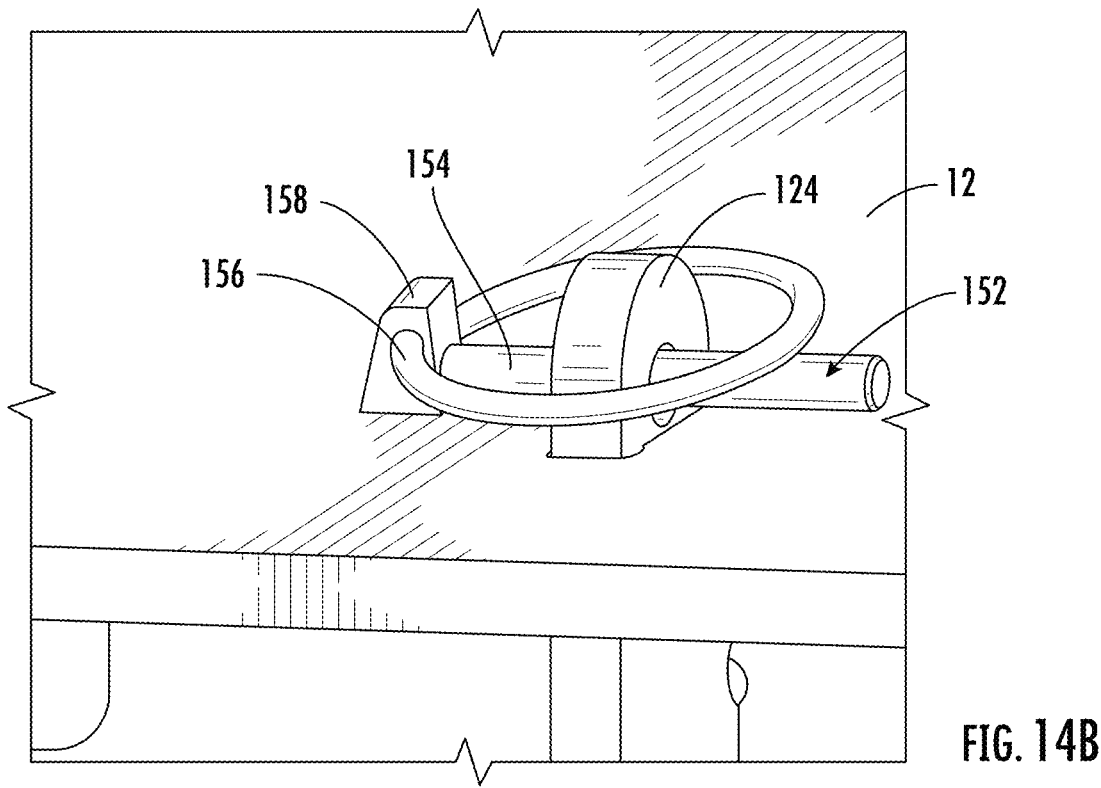
FIG. 14B is an enlarged view of a latch pin assembly that is used to engage components of a livestock coop according to an aspect of the present disclosure in an engaged and locked position.

As shown in FIGS. 14A and 14B, lynch pins may be used to securely affix the roof 12 and the nesting chamber top 26 into engagement with the other portion of the coop. These quick release clips provide excellent protection against predators, yet the ability to quickly detach parts to allow access for collecting eggs (nesting chamber) or for a thorough clean (roosting chamber roof). The lynch pin 152 typically has a stem 154, a ring 156 and a hub 158 about which the ring may rotate. The pin may engage the aperture of, for example, the roof mounting planar support 124, by placing the lynch pin therethrough and rotating the ring over the roof mounting planar support of other securing structure of the coops of the present disclosure. The lynch pins 152 of the present disclosure may also have a cutout at the end of the stem distal from the ring such that the ring will be received in the recessed portion of the distal end of the pin to more securely connect the components when the ring is flipped into the engaged position.

Figure 17A:
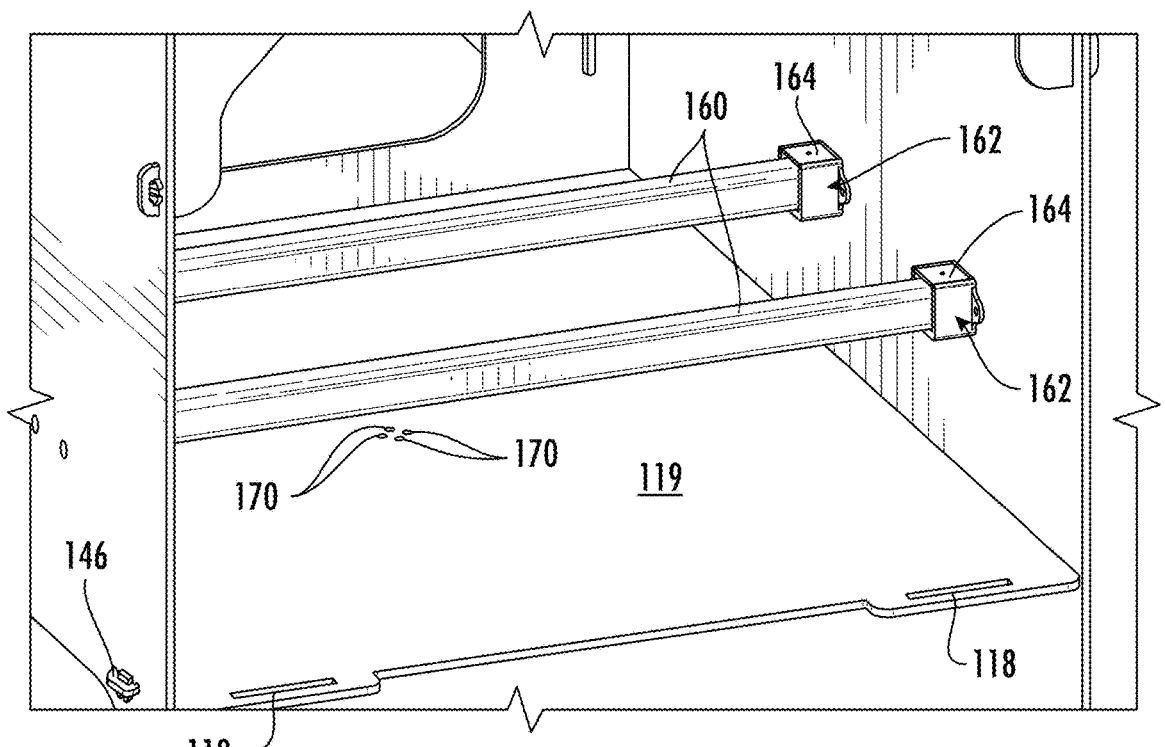
FIG. 17A is an interior view of the roosting chamber of a livestock coop according to an aspect of the present disclosure showing the interior roosting rails.
Figure 17B:
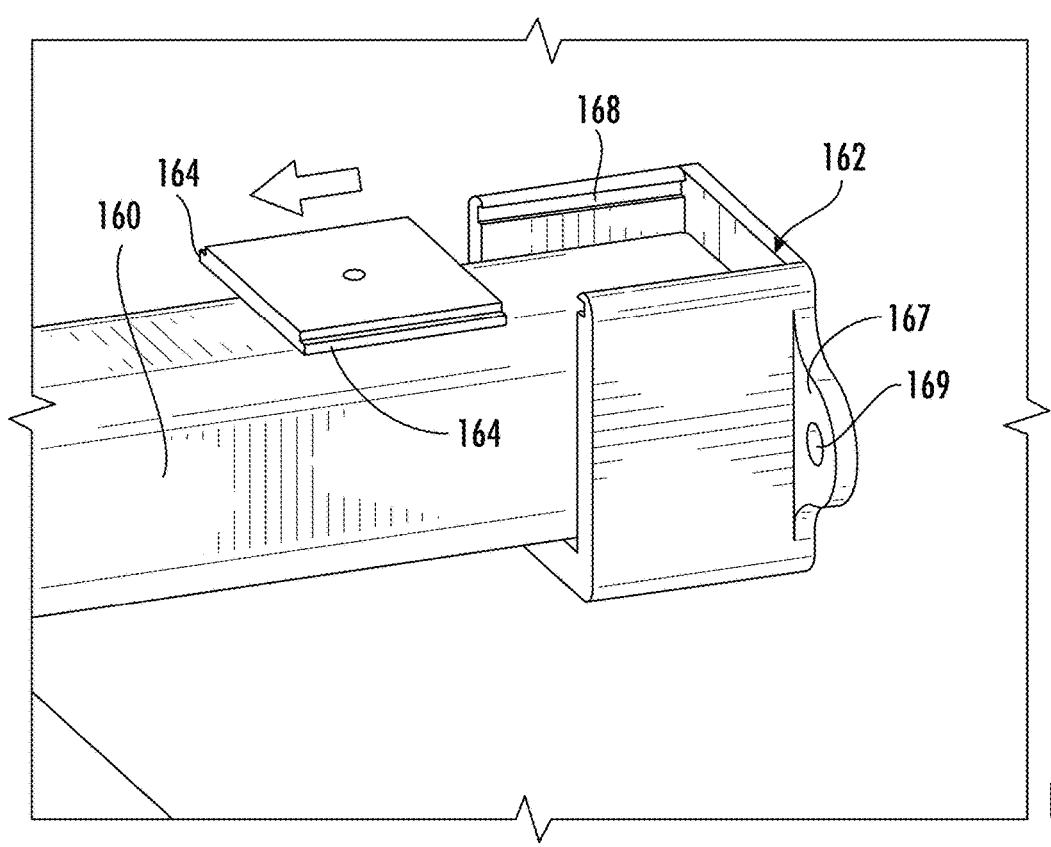
FIG. 17B is an enlarged view of the linkage attachment system that engages the interior roosting rails with the interior facing surface of a wall of the livestock coop according to an aspect of the present disclosure.
Figure 17C:
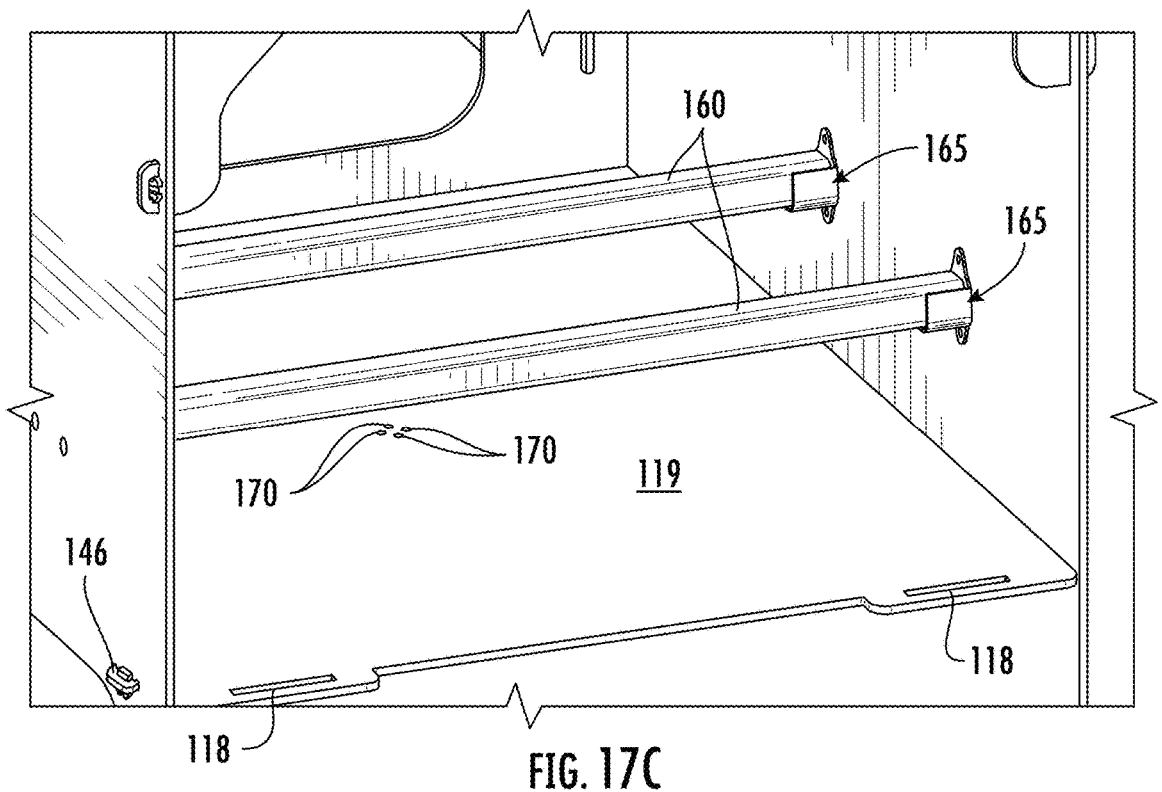
FIG. 17C is an interior view of the roosting chamber of a livestock coop showing an alternative connection for the roosting rails to the interior facing sides of the roosting chamber the according to an aspect of the present disclosure showing the interior roosting rails.
Figure 17D:
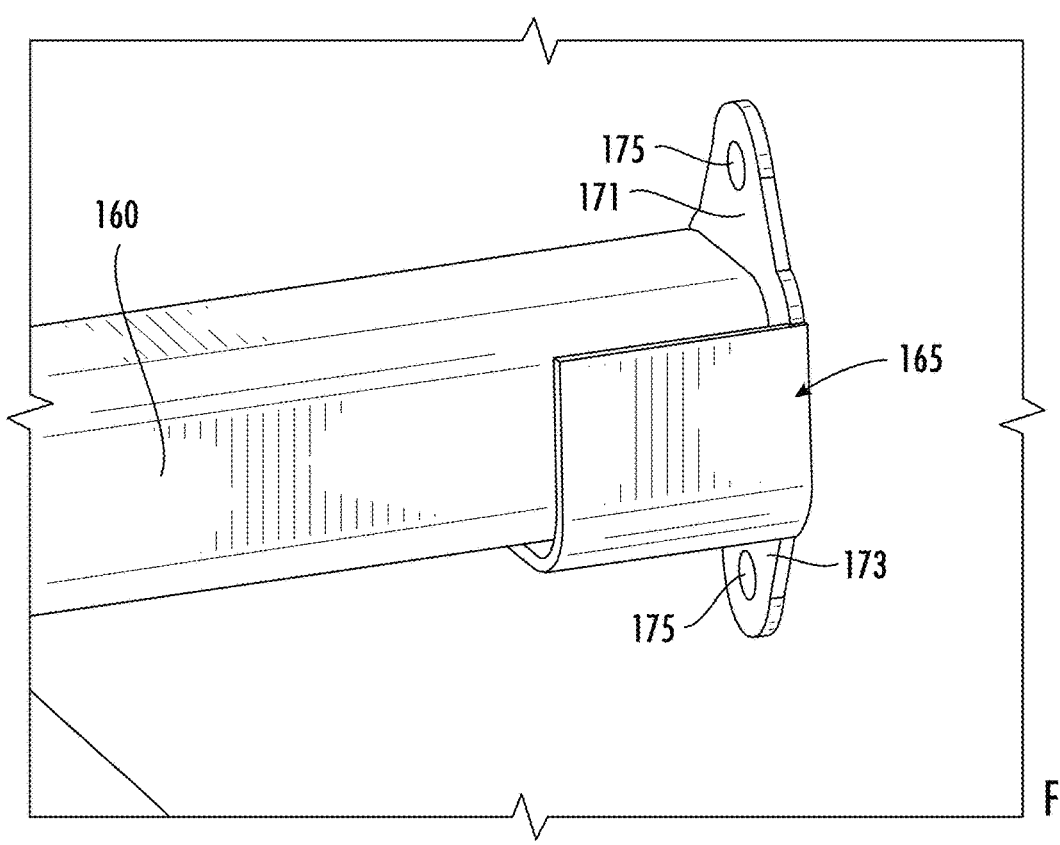
FIG. 17D is an enlarged view of the linkage attachment system shown in FIG. 17C that engages the interior roosting rails with the interior facing surface of a wall of the livestock coop according to an aspect of the present disclosure.

The coops of the present disclosure also typically include two wooden perches that are made from square batons with rounded edges. This is a shape that is best for chickens. The roosting rails 160 are securely held in place by specially designed perch holders attached to the side walls. These holders allow for quick and easy perch removal for cleaning. As shown in FIGS. 17A and 17B, the roosting rails 160 may be engaged using a roosting rail mounting bracket 162 that is an upwardly facing U-shaped bracket when installed on an interior wall of the roosting chamber. A roosting rail retaining member 164 may be employed. The roosting rail retaining member 164 typically has two opposing side projections 166 that matingly engage mounting bracket side grooves 168. In the embodiment shown in FIGS. 17A-17B, the mounting bracket 164 may be affixed to an interior surface of the roosting chamber panels by using a screw or other fastener (not shown in the Figures) through apertures 169 in each of two laterally extending flanges 167, one on each side of the Roosting rail mounting bracket. An alternative mounting bracket is shown in FIGS. 17C and 17D. The mounting bracket 165 is a generally U-shaped bracket with rounded corners. An upwardly extending flange 171 and a downwardly extending flange 173, each having an aperture 175 may be employed to receive a fastener, such as a screw. In this system for attachment of the roosting rail, the top of the bracket is typically open and free of any covering, in particularly any covering that provides a downward force to the roosting rail 160 when engaged to the bracket 162. This openness allows for the easy removal of the roosting rails 160 when, for example, the roosting rail(s) and/or the interior of the roosting chamber are being cleaned.

Figure 11A:
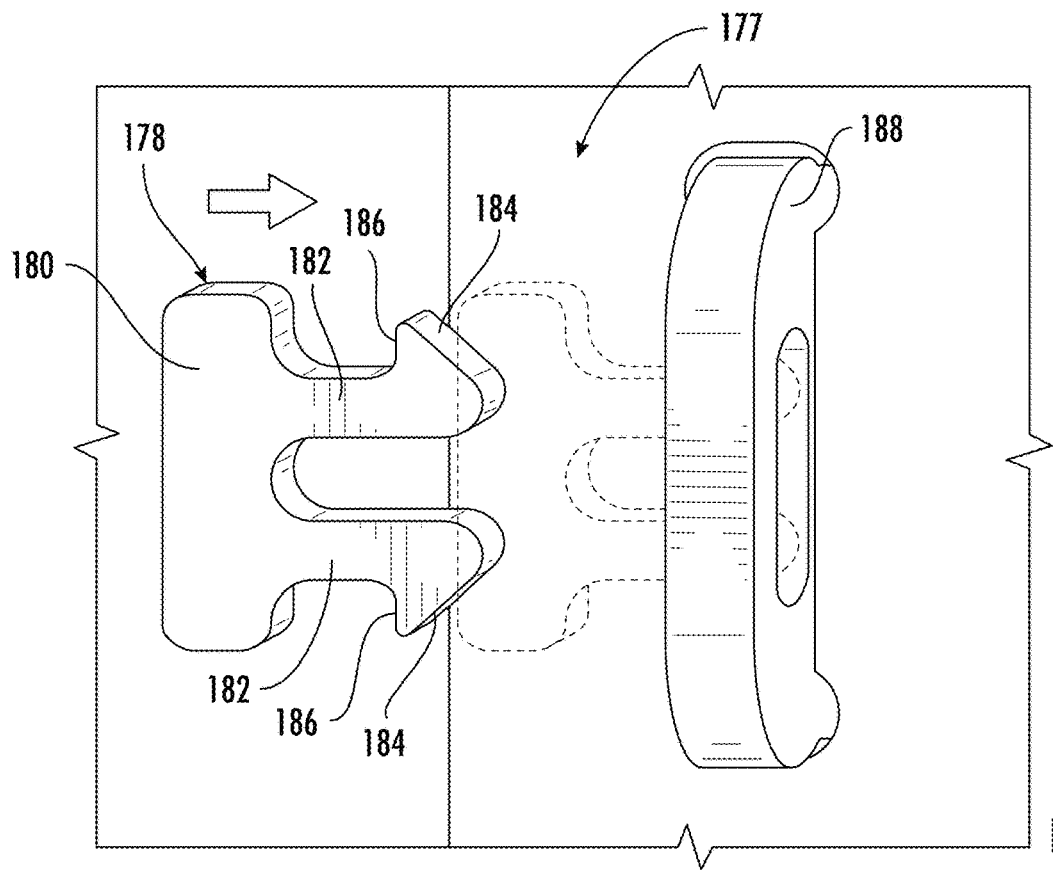
FIG. 11A shows a fastening system according to an aspect of the present disclosure that includes a Pi-shaped engaging insert that is capable of being installed by hand and without the use of tools in the disengage position.
Figure 11B:
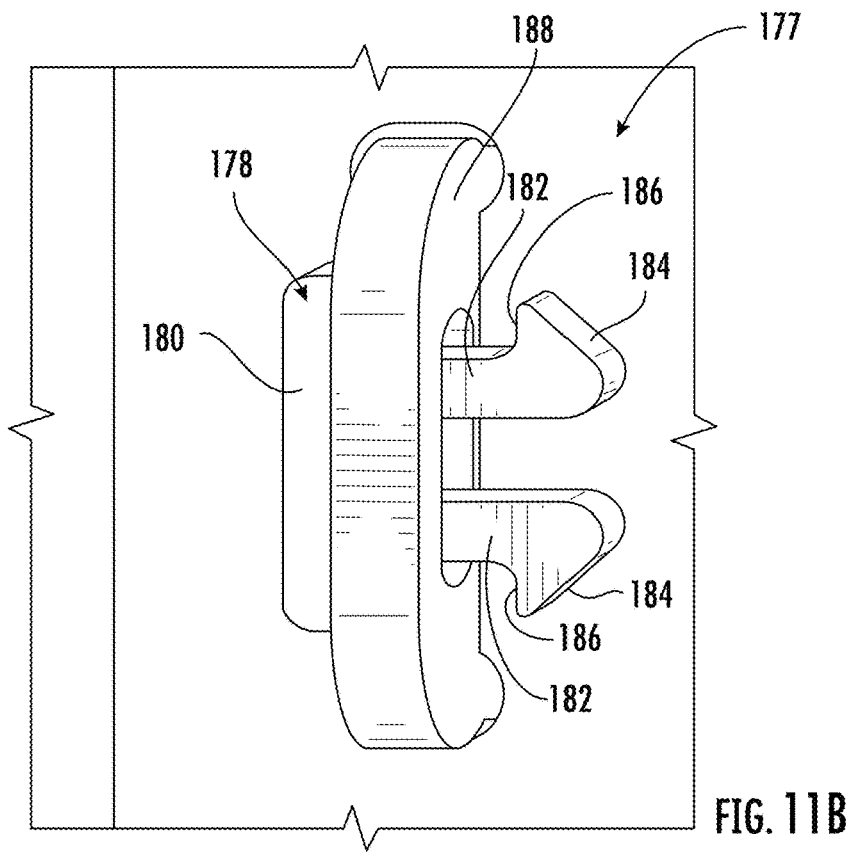
FIG. 11B shows a fastening system according to an aspect of the present disclosure that includes a Pi-shaped engaging insert that is capable of being installed by hand and without the use of tools in an engaged position.

As shown in FIGS. 11A and 11B, the livestock coops/systems of the present disclosure have various connections that employ Pi-shaped fasteners or clips as shown in these Figures. These clips, in the shape of the mathematical symbol Pi, enable a simple yet effective method of joining panels together by hand and without the use of tools. They have the advantage that the coops can be easily disassembled for a thorough deep clean. As shown, the fastening system 177 employs the Pi-shaped fastener 178 with two outwardly extending legs 182 extending away from a common main top portion 180. The downwardly extending legs 182 typically have angled portions 184 that extend outwardly to create a retention shelf 186. In use, the outwardly extending legs 182 may be squeezed together to bring them together and allow them to pass through an aperture within one of the protrusions that extend from one side of a panel to another side of the panel. An exemplary protrusion 188 is shown in the figures. Once the outwardly extending legs 182 are passed through they are allowed to move to their normal position, which results in the retentions shelf serving to retain the Pi-shaped fastener in position.

Figure 21:
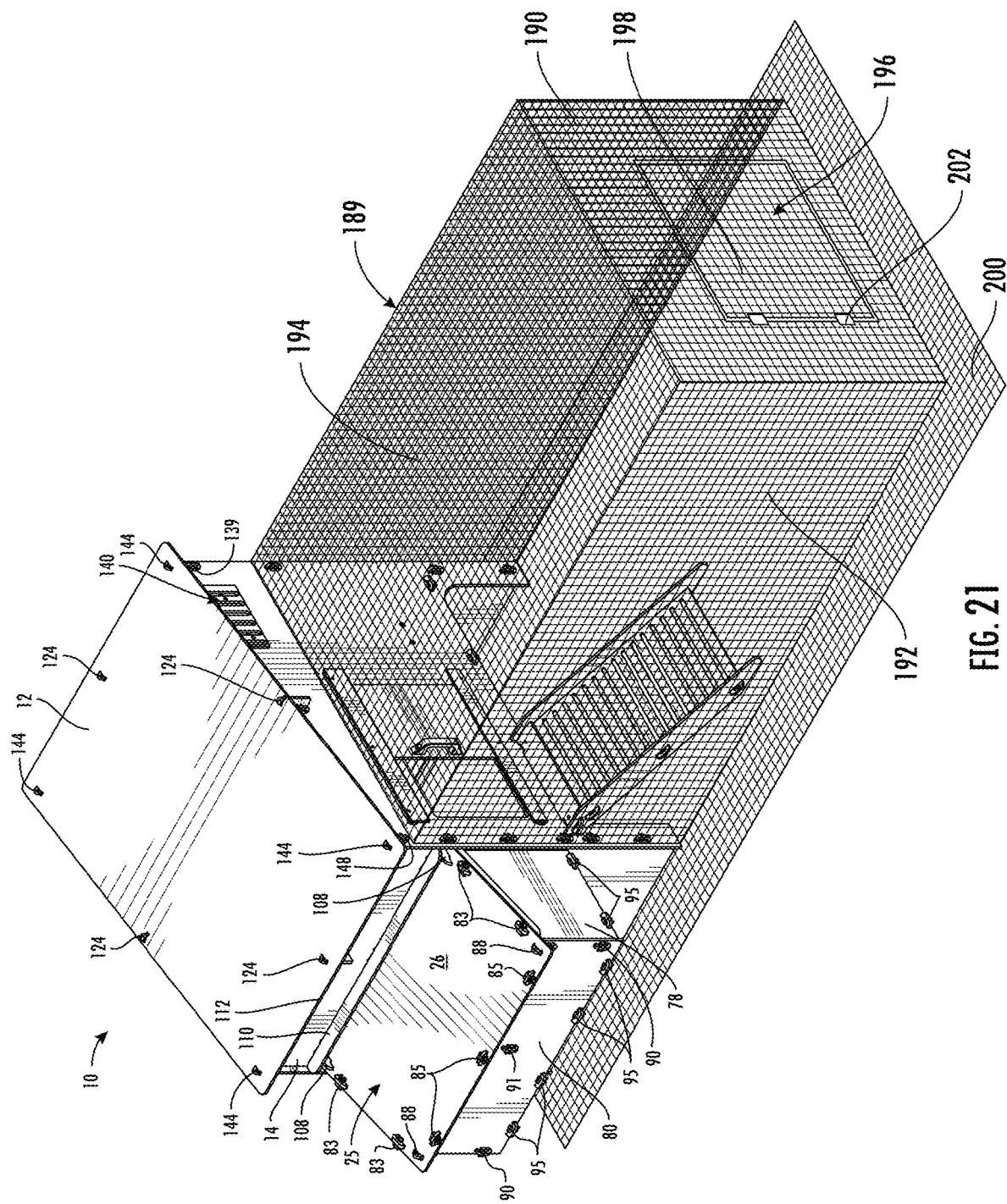
FIG. 21 is a front, upper left perspective view of a livestock coop according to an aspect of the present disclosure and having an exterior cage system attached thereto to allow the livestock an outdoor area to range and to shield the livestock from predators. The cage system shown employs a skirt portion that may lay on the ground as shown or be buried in whole or in part around the perimeter to ensure a safe seal from predators.

As shown in FIG. 21, the livestock coops of the present disclosure may employ a run 189. An optional run is available to extend the livestocks' outdoor space, typically the chickens' outdoor space. This enclosure typically consists of black powder coated steel mesh in a durable 0.1-inch gauge mesh in an about or exactly 0.18-inch steel frame. The mesh size is 1 inch by 1.5 inches and the run is fully enclosed ensuring no predators can gain entry from land or air. The run is typically modular and the run can be lengthened to suit additional capacity. A secure door is integrated into the end panel, providing access for your hens. An eight-inch predator-resistant flange is included to prevent burrowing under the run. With the livestock run in position, chickens can still access the typically 11-inch high space beneath the coop for shelter. As discussed above, the livestock run secures the rear elevation turning this space into a secure, sheltered outdoor space. Typically, a curtain 200 extends laterally away from the location where the walls 190 and 192 meet the ground. The run typically has a top 194 and an end 190. The end 190 that is distal the coop of the present disclosure typically has a door system 196 that has a door 198 that typically swings outward about at least one hinge, but typically two piano hinges or other sturdy hinges 202 capable of holding the weight of a steel mesh door. The door may be locked to prevent unauthorized access to the interior volume of the run by humans and/or predators. Alternatively, a retaining lynch pin or other retaining device that prevents the hinge from opening may be used. A key or combination "lock" is not per se needed, but may be used.

What is claimed is:

1. A poultry housing comprising:
    a roosting chamber comprised of a plurality of interlocking walls comprising a front panel, a first side panel, a back panel and a second side panel that, together with a roosting chamber floor that interlocks with the front panel, the first side panel, the back panel and the second side panel and roosting chamber roof that interlocks with the front panel, the first side panel, the back panel and the second side panel, define an interior roosting chamber volume of the roosting chamber, wherein the first side panel comprises a nesting chamber access aperture defined by a cutout perimeter spaced from a perimeter of the first side panel and wherein the second side panel comprises a roosting chamber access panel, a second side panel top section and a second side panel bottom section wherein the second side panel top section and the second side panel bottom section define a roosting chamber access aperture and the roosting chamber access panel overlays the roosting chamber access aperture and a portion of the second side panel top section and the second side panel bottom section when the roosting chamber access panel is engaged with the second side panel top section and the second side panel bottom section and wherein the roosting chamber access panel is removable and engageable by hand and without use of tools to allow a user to access the interior roosting chamber volume through the roosting chamber access aperture, and wherein the roosting chamber access panel further comprises at least one downwardly extending roosting floor aperture engaging extension that matingly engages a corresponding number of roosting floor apertures within at least one roosting chamber floor projections that extend away from a main portion of the roosting chamber floor; and
    a nesting chamber positioned over the nesting chamber access aperture within the first side panel of the roosting chamber wherein the nesting chamber comprises a left side wall, a right side wall, and end wall and a nesting chamber roof.

2. The poultry housing of claim 1, wherein the roosting chamber roof has a second side facing edge that extends past a plane defined by an exterior facing surface of the roosting chamber access panel when the roosting chamber access panel is engaged with the roosting chamber.

3. The poultry housing of claim 2, wherein at least a portion of the roosting chamber access panel extends beyond the plane defined by a top surface of the roosting chamber floor and outside the second side panel bottom section.

4. The poultry housing of claim 3, wherein the roosting chamber roof further comprises a roof mounting planar support that extends downward from the roosting chamber roof and perpendicular to the second side panel and the roosting chamber access panel further comprises a roof mounting planar support engaging notch along a top edge of the roof mounting planar support that receives the roof mounting planar support such that the roof mounting planar support is spaced within a roof mounting planar support engaging notch when the roosting chamber access panel is engaged with the roosting chamber.

5. The poultry housing of claim 1, wherein the roosting chamber roof further comprises a roof mounting planar support that extends downward from the roosting chamber roof and perpendicular to the second side panel and the roosting chamber access panel further comprises a roof mounting planar support engaging notch along a top edge of the roof mounting planar support that receives the roof mounting planar support such that the roof mounting planar support is spaced within the roof mounting planar support engaging notch when the roosting chamber access panel is engaged with the roosting chamber.

6. The poultry housing of claim 1, further comprising a moisture guard engaged with the first side panel and above the nesting chamber roof.

7. The poultry housing of claim 6, wherein the moisture guard is planar and extends between the front panel and the back panel of the roosting chamber and is at least partially positioned within a horizontal channel within the first side panel of the roosting chamber.

8. The poultry housing of claim 6, wherein the roosting chamber roof is a planar panel positioned at an angle of from about 8 to about 12 degrees from a plane defined by the roosting chamber floor and wherein an elevated roosting chamber roof side wall proximate the second side panel is elevated above a lower roosting chamber roof side wall that is proximate the first side panel and wherein the lower roosting chamber roof side wall extends beyond the plane of the first side panel's exterior facing surface and the elevated roosting chamber roof side wall extends beyond the plane of an exterior facing surface of the second side panel.

9. The poultry housing of claim 8, wherein the nesting chamber roof comprises a roosting chamber facing side and an opposite nesting chamber roof side, wherein the nesting chamber roof is a planar panel positioned at an angle of from about 15 to about 20 degrees from the plane of a nesting chamber floor;
  wherein the roosting chamber facing side is elevated above the opposite nesting chamber roof side and wherein the nesting chamber roof side extends beyond the plane defined by an exterior surface of the end wall of the nesting chamber; and
  wherein the roosting chamber facing side is adjacent the first side panel of the roosting chamber below the moisture guard.

10. The poultry housing of claim 1, wherein at least two of the front panel, the first side panel, the back panel, the second side panel, the roosting chamber floor, the left side wall, the right side wall, the end wall, and the nesting chamber roof are a composite plastic material, wherein the composite plastic material comprises:
  1) An outer layer, an inner layer, and a middle layer consisting of recycled plastic material disposed between the outer layer and the inner layer; or
  2) An outer layer and an inner layer, wherein the inner layer consists of recycled plastic material;
  wherein the composite plastic material has an interior facing surface that is smooth and an exterior facing surface that is colored and textured or patterned; and
  wherein the composite plastic material comprises recycled plastic material in an amount up to 70% by weight of the composite plastic material.

11. The poultry housing of claim 1, further comprising a poultry ramp system that is connected to the front panel of the roosting chamber or the back panel of the roosting chamber at a position below a roosting chamber access door;
  wherein the poultry ramp system comprises:
    a poultry ramp having a poultry ramp top surface;
    a left side planar ramp support wall engaged to a left side of the poultry ramp and that extends above the poultry ramp top surface;
    a right side planar ramp support wall engaged to a right side of the poultry ramp and that extends above the poultry ramp top surface;
    a planar horizontally positioned step engaged with the poultry ramp and the front panel or the back panel of the roosting chamber below the roosting chamber access door; and
    wherein both the left side planar ramp support wall and the right side planar ramp support wall are engaged and disengaged with the poultry ramp by hand and without the use of tools using lateral projections on both sides of the poultry ramp that matingly engage corresponding apertures in the right side planar ramp support wall and the left side planar ramp support wall.

12. The poultry housing of claim 11, wherein the roosting chamber access door comprises:
  a sliding door panel having a handle on an exterior facing surface thereof, wherein the sliding door panel comprises a first aperture proximate the upper left of the sliding access door panel and a second aperture proximate the upper right of the sliding access door panel;
  an interior mounting bracket having a first pin receiving aperture and a second pin receiving aperture wherein the interior mounting bracket is positioned proximate an interior facing surface of the front panel or the back panel having the roosting chamber access door therein;
  a first pin that is (1) positioned within the first aperture proximate an upper left portion of the sliding access door panel (2) through a riding within a horizontal slot within the front panel or the back panel having the roosting chamber access door therein, and (3) engaged with the first pin receiving aperture of the interior mounting bracket;
  a second pin that is (1) positioned within the second aperture proximate the upper left portion of the sliding access door panel (2) through a riding within the horizontal slot within the front panel or the back panel having the roosting chamber access door therein, and (3) engaged with the second pin receiving aperture of the interior mounting bracket;
  a top support panel that covers the horizontal slot and positioned over a top portion of the sliding door panel to create a first sliding door traveling channel between an exterior surface to the front panel or the back panel having the roosting chamber access door therein; and
  a bottom support panel that covers a bottom portion of the sliding door panel to create a second sliding door traveling channel between the exterior surface to the front panel or the back panel having the roosting chamber access door therein.

13. The poultry housing of claim 12, further comprising a plurality of roosting rails spanning between the front panel and the back panel comprising a first roosting rail and wherein the first roosting rail comprises a front panel end portion proximate the front panel and spaced within a front panel roosting rail bracket that is affixed to the front panel and a back panel end portion proximate the back panel and spaced within a back panel roosting rail bracket affixed to the back panel and wherein the first roosting rail is removably connected to the front panel roosting rail bracket and the back panel roosting rail bracket by hand and without the use of tools and, if removed, optionally reengaged with the front panel roosting rail bracket and the back panel roosting rail bracket by hand and without the use of tools;
  wherein the poultry housing is a chicken coop that only houses egg laying chickens and no other livestock; and
  wherein the chicken coop further comprises a chicken run cage system engaged with the chicken coop such that chickens egressing through the roosting chamber access door cannot move from an interior volume of the chicken run cage system to outside the chicken run cage system and wherein the chicken run cage system further comprises an apron of caging extending laterally away from upright portions of the chicken run cage system where the chicken run cage system engages ground proximate the poultry ramp system.

14. The poultry housing of claim 1, further comprising a ventilation system comprising crenelation apertures in the first side panel proximate the top of the first side panel and proximate the roosting chamber roof, and ventilation system vent in at least one of an upper corner of the front panel proximate the second side panel opposite the crenelation apertures and above a level of the crenelation apertures, an upper corner of the back panel proximate the second side panel opposite the crenelation apertures and above the level of the crenelation apertures, and wherein the ventilation system vent is moveable between a closed and open position by hand and without the use of tools and the ventilation system vent has a plurality of vent apertures that allow airflow from the interior roosting chamber volume of a roosting chamber to outside the roosting chamber.

15. A chicken coop comprising:
a plurality of interlocking walls comprising a front panel, a first side panel, a back panel and a second side panel that together with a roosting chamber floor and roosting chamber roof define an interior roosting chamber volume of a roosting chamber, wherein the first side panel comprises a nesting chamber access aperture defined by a cutout perimeter spaced from a perimeter of the first side panel and wherein the second side panel comprises a roosting chamber access panel, a second side panel top section and a second side panel bottom section;
a nesting chamber positioned over the nesting chamber access aperture within the first side panel of the roosting chamber wherein the nesting chamber comprises a left side wall, a right side wall, and end wall and a nesting chamber roof; and
a moisture guard engaged with the first side panel and above the nesting chamber roof, wherein the moisture guard is planar and extends between the front panel and the back panel of the roosting chamber.

16. The chicken coop of claim 15, wherein the roosting chamber roof is a planar panel positioned at an angled from a plane defined by the roosting chamber floor and wherein an elevated roosting chamber roof side wall proximate the second side panel is elevated above a lower roosting chamber roof side wall that is proximate the first side panel and wherein the lower roosting chamber roof side wall extends beyond the plane of the first side panel's exterior facing surface and the elevated roosting chamber roof side wall extends beyond the plane of an exterior facing surface of the second side panel;
wherein the nesting chamber roof comprises a roosting chamber facing side and an opposite nesting chamber roof side, wherein the nesting chamber roof is a planar panel positioned at an angled the plane of a nesting chamber floor;
wherein the roosting chamber facing side is elevated above the opposite nesting chamber roof side and wherein the nesting chamber roof side extends beyond the plane defined by an exterior surface of the end wall of the nesting chamber; and
wherein the roosting chamber facing side is adjacent the first side panel of the roosting chamber below the moisture guard.

17. The chicken coop of claim 15, wherein at least two of the front panel, the first side panel, the back panel, the second side panel, the roosting chamber floor, the left side wall, the right side wall, the end wall, and the nesting chamber roof are a composite plastic material wherein the composite plastic material comprises:
1) An outer layer, an inner layer, and a middle layer consisting of recycled plastic material disposed between the outer layer and the inner layer; or
2) An outer layer and an inner layer, wherein the inner layer consists of recycled plastic material;
wherein the composite plastic material has an interior facing surface that is smooth and an exterior facing surface that is colored and textured or patterned; and
wherein the composite plastic material comprises at least 10% and up 70% by weight recycled plastic material.

18. The chicken coop of claim 15, further comprising a poultry ramp system that is connected to the front panel of the roosting chamber or the back panel of the roosting chamber at a position below a roosting chamber access door;
wherein the poultry ramp system comprises:
a poultry ramp having a poultry ramp top surface;
a left side planar ramp support wall engaged to a left side of the poultry ramp and that extends above the poultry ramp top surface;
a right side planar ramp support wall engaged to a right side of the poultry ramp and that extends above the poultry ramp top surface;
a planar horizontally positioned step engaged with the poultry ramp and the front panel or the back panel of the roosting chamber below the roosting chamber access door;
wherein both the left side planar ramp support wall and the right side planar ramp support wall are engaged and disengaged with the poultry ramp by hand and without use of tools using lateral projections on both sides of the poultry ramp that matingly engage corresponding apertures in the right side planar ramp support wall and the left side planar ramp support wall;
wherein the roosting chamber access door comprises:
a sliding door panel having a handle on an exterior facing surface thereof, wherein the sliding door panel comprises a first aperture proximate the upper left of the sliding access door panel and a second aperture proximate the upper right of the sliding access door panel;
an interior mounting bracket having a first pin receiving aperture and a second pin receiving aperture wherein the interior mounting bracket is positioned proximate an interior facing surface of the front panel or the back panel having the roosting chamber access door therein;
a first pin that is (1) positioned within the first aperture proximate an upper left portion of the sliding access door panel (2) through a riding within a horizontal slot within the front panel or the back panel having the roosting chamber access door therein, and (3) engaged with the first pin receiving aperture of the interior mounting bracket;
a second pin that is (1) positioned within the second aperture proximate the upper left portion of the sliding access door panel (2) through a riding within the horizontal slot within the front panel or the back panel having the roosting chamber access door therein, and (3) engaged with the second pin receiving aperture of the interior mounting bracket;
a top support panel that covers the horizontal slot and positioned over a top portion of the sliding door panel to create a first sliding door traveling channel between an exterior surface to the front panel or an exterior surface of the back panel having the roosting chamber access door therein; and
a bottom support panel that covers a bottom portion of the sliding door panel to create a second sliding door traveling channel between the exterior surface to the front panel or the back panel having the roosting chamber access door therein.

19. The chicken coop of claim 15, further comprising a ventilation system comprising crenelation apertures in the first side panel proximate the top of the first side panel and proximate the roosting chamber roof, and ventilation system vent in at least one of an upper corner of the front panel proximate the second side panel opposite the crenelation apertures and above a level of the crenelation apertures, an upper corner of the back panel proximate the second side panel opposite the crenelation apertures and above the level of the crenelation apertures, and wherein the ventilation system vent is moveable between a closed and open position by hand and without use of tools and the ventilation system vent has a plurality of vent apertures that allow airflow from the interior roosting chamber volume of a roosting chamber to outside the roosting chamber; and wherein the roosting chamber floor comprises at least one drain hole within a center portion of the roosting chamber floor.

20. A chicken coop construction kit comprising chicken coop construction materials packaged in one or more cuboid shaped containers wherein the chicken coop construction materials comprise at least the following components packaged in the one or more cuboid shaped containers that are stackable when shipped:

a roosting chamber front panel;
a roosting chamber first side panel;
a roosting chamber back panel;
a roosting chamber second side panel having a centrally located nesting chamber access aperture therein;
a roosting chamber floor having at least one drain hole proximate a center of the roosting chamber floor;
a roosting chamber roof;
a nesting chamber left side wall;
a nesting chamber right side wall;
a nesting chamber end wall;
a nesting chamber roof;
a poultry ramp;
a left side planar ramp support wall;
a right side planar ramp support wall;
a planar horizontally positioned step;
an elongated, planar moisture guard; and
a plurality of fasteners;
wherein at least the roosting chamber front panel, the roosting chamber first side panel, the roosting chamber back panel, the roosting chamber second side panel, the roosting chamber floor, the nesting chamber left side wall, the nesting chamber right side wall, the nesting chamber end wall, and the nesting chamber roof are a composite plastic material, wherein the composite plastic material comprises:

1) An outer layer, an inner layer, and a middle layer consisting of recycled plastic material disposed between the outer layer and the inner layer; or
2) An outer layer and an inner layer, wherein the inner layer consists of recycled plastic material;

wherein the composite plastic material comprises an exterior facing surface having a feature chosen from the group consisting of at least one color that is not black, a texturization viewable by the naked eye, a wood grain pattern viewable by the naked eye and combinations thereof; and wherein the composite plastic material comprises recycled plastic material in an amount up to 70% by weight of the composite plastic material.

* * * * *